US010922823B2

(12) United States Patent
Ohta

(10) Patent No.: US 10,922,823 B2
(45) Date of Patent: Feb. 16, 2021

(54) MOTION ANALYIS DEVICE, MOTION ANALYSIS METHOD, AND PROGRAM RECORDING MEDIUM

(71) Applicant: NEC Corporation, Tokyo (JP)

(72) Inventor: Masahiko Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 16/327,701

(22) PCT Filed: Aug. 7, 2017

(86) PCT No.: PCT/JP2017/028527
§ 371 (c)(1),
(2) Date: Feb. 22, 2019

(87) PCT Pub. No.: WO2018/037891
PCT Pub. Date: Mar. 1, 2018

(65) Prior Publication Data
US 2019/0220984 A1    Jul. 18, 2019

(30) Foreign Application Priority Data

Aug. 25, 2016  (JP) .............................. JP2016-164719

(51) Int. Cl.
*G06T 7/246*  (2017.01)
(52) U.S. Cl.
CPC .................... *G06T 7/248* (2017.01)
(58) Field of Classification Search
CPC ............................................. G06T 7/20–292
See application file for complete search history.

(56) References Cited

U.S. PATENT DOCUMENTS

| 2011/0157391 A1* | 6/2011 | Chen | ...................... G06T 7/20 |
| | | | 348/222.1 |
| 2013/0038694 A1* | 2/2013 | Nichani | .............. G06K 9/2036 |
| | | | 348/46 |

(Continued)

FOREIGN PATENT DOCUMENTS

| JP | 02-284267 A | 11/1990 |
| JP | 07-31249 B2 | 4/1995 |

(Continued)

OTHER PUBLICATIONS

International Search Report of PCT/JP2017/028527 dated Oct. 31, 2017.

(Continued)

*Primary Examiner* — Casey L Kretzer
(74) *Attorney, Agent, or Firm* — Sughrue Mion, PLLC

(57) ABSTRACT

An image processing device 1 selects, from among images in which an object to be sensed is captured, a representation image which is a reference for processing. In a state of the representation image being selected, the image processing device carries out a comparative analysis between the representation image and the image which differs from the image which has been selected as the representation image, and thereby computes a degree of displacement between the representation image and the image. From among the images which have been assigned as reference images, the image processing device selects the reference image which will be used in a process of analyzing the movement of the object to be sensed, on the basis of the degree of displacement which has been computed.

6 Claims, 20 Drawing Sheets

(56) References Cited

U.S. PATENT DOCUMENTS

2014/0028850 A1* 1/2014 Keating ................ G06T 7/246
348/158
2015/0206027 A1* 7/2015 Fisher .................. G06Q 30/02
382/225
2015/0345936 A1 12/2015 Sumitomo

FOREIGN PATENT DOCUMENTS

| JP | 2006-033142 A | 2/2006 |
|---|---|---|
| JP | 2007-304852 A | 11/2007 |
| JP | 2009-077363 A | 4/2009 |
| JP | 2009-245287 A | 10/2009 |
| WO | 2014/002813 A1 | 1/2014 |

OTHER PUBLICATIONS

Written Opinion of the International Searching Authority of PCT/JP2017/028527 dated Oct. 31, 2017.

* cited by examiner

MOTION ANALYIS DEVICE, MOTION ANALYSIS METHOD, AND PROGRAM RECORDING MEDIUM

CROSS REFERENCE TO RELATED APPLICATIONS

This application is a National Stage of International Application No. PCT/JP2017/028527 filed Aug. 7, 2017, claiming priority based on Japanese Patent Application No. 2016-164719 filed Aug. 25, 2016, the disclosures of which are incorporated herein in their entirety by reference.

TECHNICAL FIELD

The present invention relates to a technique for capturing an object in motion, and detecting (observing) motion of the object by image processing.

BACKGROUND ART

A factory line, a belt conveyor, a rotationally moving antenna, or the like has a movable part which moves with periodicity. Further, an entrance/exit gate or the like also has a movable part which performs open/close motion. The movable parts each make such motion as to move at a same position, repetitively take a same posture, or repeat same deformation. A technique for inspecting a movable part making such motion, without stopping movement thereof, is required.

For example, it is conceivable to inspect the movable part by performing image processing of an image of the movable part captured by a camera, and analyzing information obtained by the image processing. In order to achieve an inspection for the movable part, utilizing such image processing, it is necessary to, for example, when the movable part is a rotation body, capture the rotating movable part, and compare and thus analyze images of the movable part captured at different timings such as first rotation movement and second rotation movement. In order to compare the image of the movable part for an inspection in such a way, it is necessary to compare and analyze images of the movable part for respective predetermined operation timings.

Techniques for obtaining an image adjusted to an operation timing of an object are suggested in, for example, PTL 1 (Japanese Unexamined Patent Application Publication No. H02-284267) and PTL 2 (Japanese Examined Patent Publication No. H07-31249). In these techniques, a sensor which detects an object in motion is disposed alongside of a camera or a light source. When the sensor detects an object to be an observation target, a trigger signal output from the sensor is taken into a processing device. Then, in order to operate the camera or the light source at a timing when the object to be the observation target comes into a field angle of the camera, the processing device gives a delay at a timing when the trigger signal is received, and then transmits a control signal toward the camera and the light source. The processing device controls the camera and the light source in this way.

CITATION LIST

Patent Literature

[PTL 1] Japanese Unexamined Patent Application Publication No. H02 (1990)-284267

[PTL 2] Japanese Examined Patent Publication No. H07 (1995)-31249

SUMMARY OF INVENTION

Technical Problem

However, with the above-described techniques, variation in capturing timing becomes a problem, when an object in motion is captured by utilizing the sensor and the camera. Normally, it takes a time (response time) of several ten microseconds (μs) to several ten milliseconds (ms), for the sensor which detects an object in motion, to output a signal after detecting an object. Generally, the response time of such the sensor depends mainly on a "delay" resulting from internal processing, and "variation in output timing".

A time of a "delay" is a substantially constant and presumable time. Therefore, after taking the trigger signal from the sensor, a processing device transmits the control signal considering the delay time to the camera or the light source, and thereby enables the "delay" to be eliminated. On the other hand, since a time of "variation in output timing" fluctuates, and is difficult to presume, it is difficult for the processing device to output the trigger signal from the sensor in order to eliminate the "variation in output timing" of the sensor. Therefore, "variation in output timing" of the sensor becomes one factor of variation in capturing timing of the camera.

Furthermore, it also takes the time (response time) of several ten microseconds (μs) to several ten milliseconds (ms), for the camera, to capture after receiving the trigger signal (camera control signal). Factors for the response time of the camera also include the "delay" resulting from internal processing, and "variation in execution timing". The "delay" of the camera can also be eliminated by the processing device in a way similar to the "delay" of the sensor. However, it is difficult to eliminate "variation in execution timing" of the camera in a way similar to "variation in output timing" of the sensor. Thus, "variation in execution timing" of the camera also becomes one factor of variation in capturing timing of the camera.

When the capturing timing of the camera varies, there occurs, in the case where an object being a subject is in motion, a situation where a position or posture of the object in an image varies. Herein, it is assumed that, when a movable part needs to be inspected by observing and analyzing a state of the movable part based on an image of an object in motion (movable part), variation in the position or posture of the movable part in the image has become greater than magnitude of behavior of an observation target part in the movable part. In this case, due to the variation, there occurs a problem that it is difficult to detect behavior of the observation target part in the movable part by image processing.

The present invention has been devised in order to solve the problem described above. In other words, a main object of the present invention is to provide a technique for reducing an impact of variation in capturing timing with respect to detection for detecting motion of an object captured without stopping motion of the object in motion and thereby detecting (observing) the motion of the object in motion with precision.

Solution to Problem

To achieve the above object, an image processing device of an example embodiment includes:

a representation selection unit that selects a representation image from among captured images in which a target object to be detected is captured, the representation image being a criterion for processing;

a displacement analysis unit that calculates a displacement amount between the representation image and a processing target image by comparing and analyzing the representation image and the processing target image after the representation image is selected, the processing target image being the captured image which differs from the captured image selected as the representation image; and a reference selection unit that selects, from among the captured images determined as reference images, the reference image to be used in processing of analyzing motion of the target object based on the calculated displacement amount.

An image processing system of an example embodiment includes:

an image device that captures a target object to be detected; and the image processing device.

An image processing method of an example embodiment includes:

selecting a representation image from among captured images in which a target object to be detected is captured, the representation image being a criterion for processing;

calculating a displacement amount between the representation image and a processing target image by comparing and analyzing the representation image and the processing target image after the representation image is selected, the processing target image being the captured image which differs from the captured image selected as the representation image; and selecting, from among the captured images determined as reference images, the reference image to be used in processing of analyzing motion of the target object based on the calculated displacement amount.

A program storage medium of an example embodiment stores a computer program which causes a computer to execute:

selecting a representation image from among captured images in which a target object to be detected is captured, the representation image being a criterion for processing;

calculating a displacement amount between the representation image and a processing target image by comparing and analyzing the representation image and the processing target image after the representation image is selected, the processing target image being the captured image which differs from the captured image selected as the representation image; and selecting, from among the captured images determined as reference images, the reference image to be used in processing of analyzing motion of the target object based on the calculated displacement amount.

Note that the above-described main object of the present invention is also achieved by an image processing method of the present invention corresponding to an image processing device of the present invention. Moreover, the above-described main object of the present invention is also achieved by a computer program of the present invention corresponding to the image processing device and the image processing method of the present invention, and a program storage medium saving the computer program.

Advantageous Effects of Invention

According to the present invention, it is possible to reduce an impact of variation in capturing timing with respect to detection for detecting motion of an object captured without stopping motion of the object in motion and thereby detect (observe) the motion of the object in motion with precision.

EXAMPLE EMBODIMENT

Hereinafter, example embodiments according to the present invention will be described with reference to the drawings.

First Example Embodiment

Figure 1:
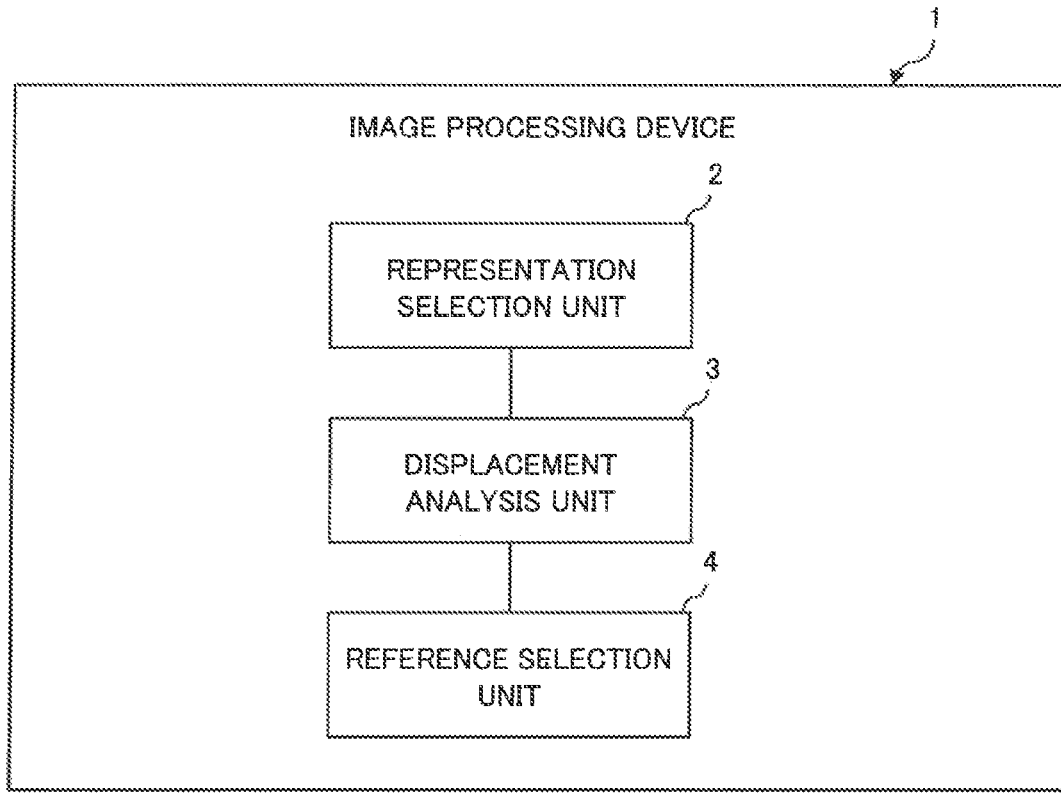
FIG. 1 is a block diagram representing simply a configuration of an image processing device in a first example embodiment according to the present invention.
Figure 2:
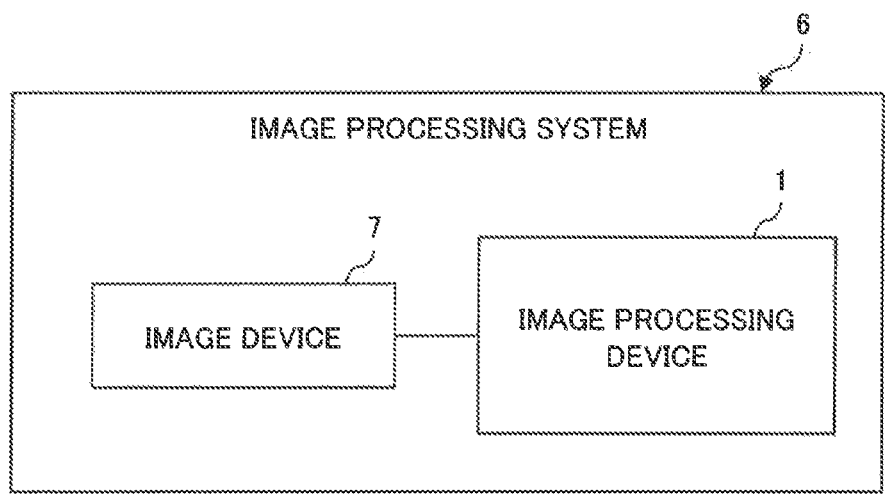
FIG. 2 is a block diagram representing simply a configuration of an image processing system including the image processing device in the first example embodiment according to the present invention.

FIG. 1 is a block diagram representing simply a configuration example of an image processing device in a first example embodiment according to the present invention. As represented in FIG. 2, an image processing device 1 according to the first example embodiment constitutes an image processing system 6 together with an image device 7.

The image device 7 includes a function of capturing an image of a target object.

The image processing device 1 includes a representation selection unit 2, a displacement analysis unit 3, and a reference selection unit 4. The representation selection unit 2 includes a function of selecting a representation image from among captured images in which a target object is captured. The representation image is an image to be a criterion for processing.

The displacement analysis unit 3 includes a function of calculating a displacement amount between the representation image and the captured image by comparing and analyzing the representation image and the captured image differing from the representation image after the representation image is selected. The displacement amount herein may be displacement amounts (or a total thereof) of the whole image, or displacement amounts (or a total thereof) in a region of interest (ROI) within an image. Among such displacement amounts, the displacement analysis unit 3 calculates a predetermined displacement amount.

The reference selection unit 4 includes a function of selecting, from among the captured images determined as reference images, the reference image to be used in processing of analyzing motion of the target object based on the displacement amount calculated by the displacement analysis unit 3.

The image processing device 1 according to the first example embodiment includes a configuration which selects an image (reference image) to be used in the processing of analyzing motion of the target object based on the displacement amount between the captured image and the representation image being the captured image captured under a same condition in the past. By analyzation of motion of the target object while utilizing the reference image selected in this way, the image processing device 1 can reduce an impact of variation in capturing timing with respect to detection for detecting motion of an object captured without stopping motion of the object in motion and thereby detect the motion of the object in motion with precision.

Second Example Embodiment

Hereinafter, a second example embodiment according to the present invention is described.

Figure 3:
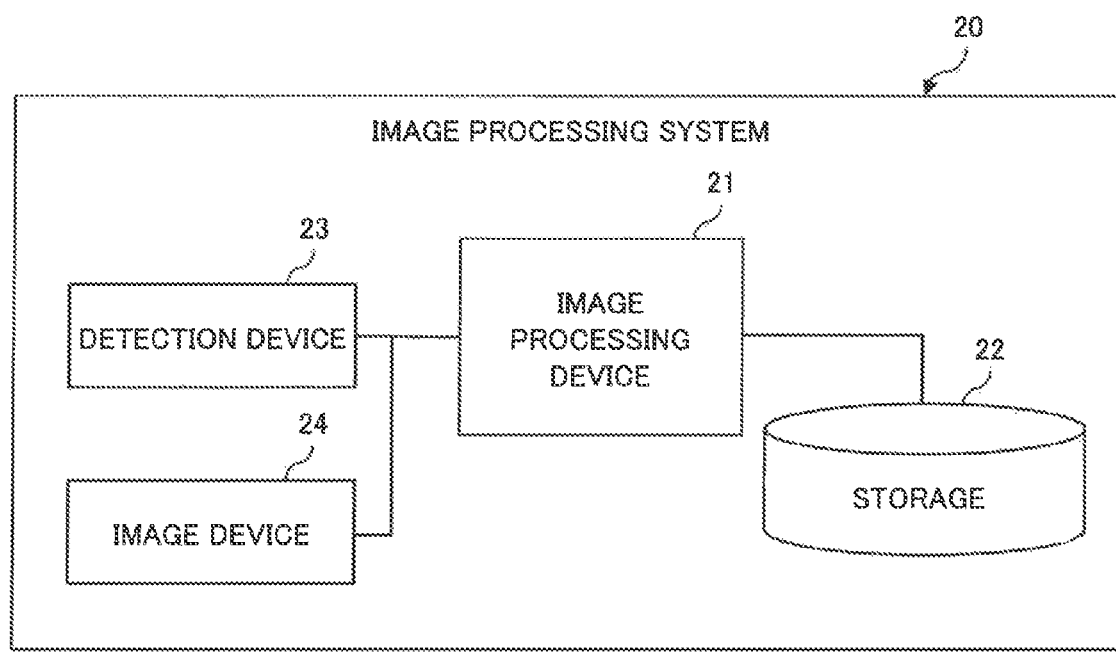
FIG. 3 is a block diagram representing simply a configuration of an image processing system including an image processing device in a second example embodiment according to the present invention.
Figure 4:
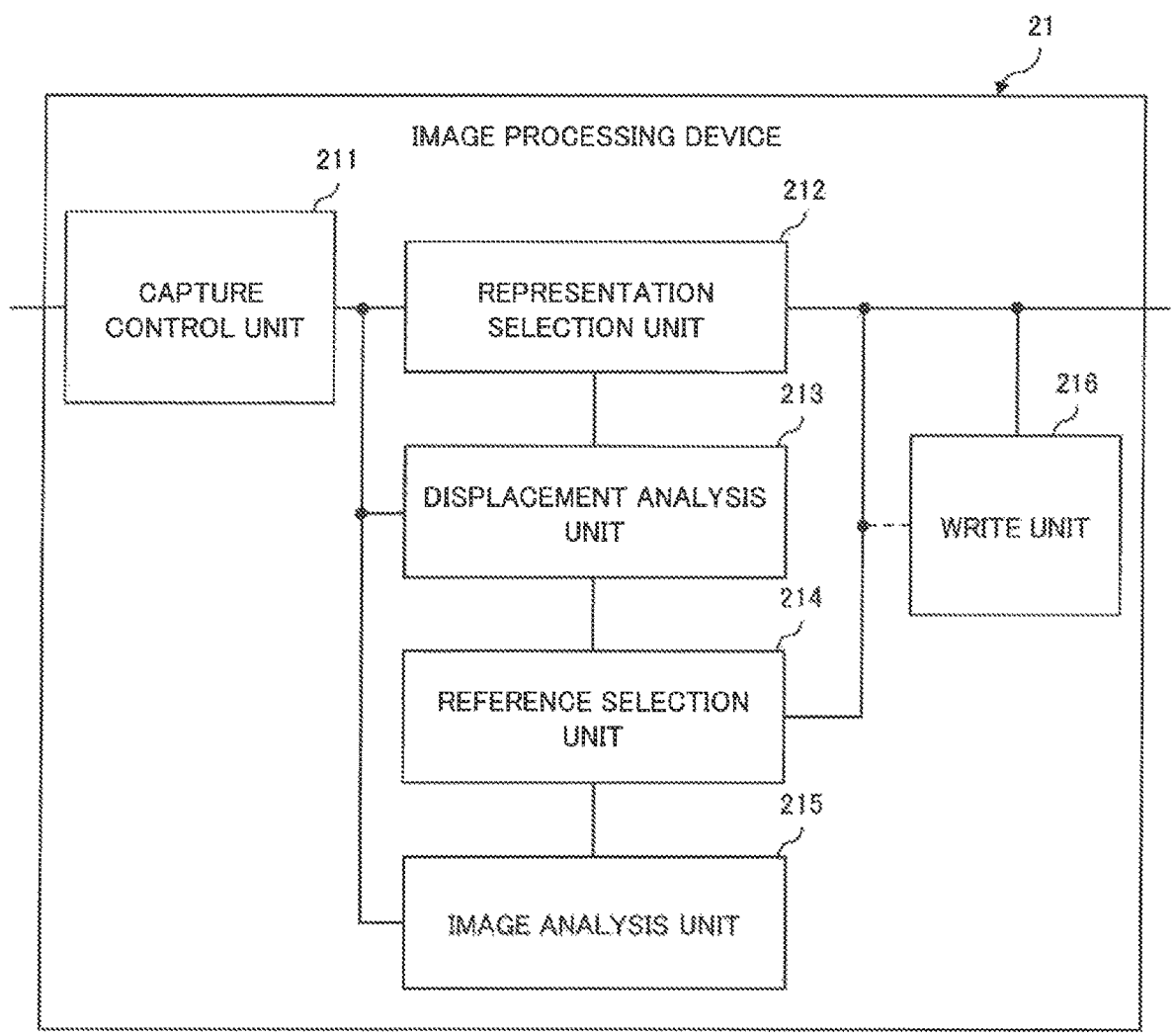
FIG. 4 is a block diagram representing simply a configuration of the image processing device in the second example embodiment according to the present invention.

FIG. 3 is a block diagram representing simply a configuration of an image processing system including an image processing device in the second example embodiment according to the present invention. FIG. 4 is a block diagram representing simply a configuration of the image processing device according to the second example embodiment.

In the second example embodiment, an image processing system 20 is applied to a system (e.g., a system which performs processing of detecting an abnormality of a rotary and movable member in a factory line, facility equipment, or the like) which detects (observes) motion of an object by utilizing an image in which the object is captured. The image processing system 20 includes an image processing device 21, a storage 22, a detection device 23, and an image device 24. The image processing device 21 is communicably connected to the storage 22, the detection device 23 and the image device 24. The detection device 23 and the image device 24 are disposed in a state of being able to detect or capture motion of an object.

The image device 24 is configured by an image sensor, a camera, a video camera, or the like. The image device 24 includes a configuration that executes a capture operation in response to a capture control signal supplied from the image processing device 21 and outputs a captured image to the image processing device 21.

The detection device 23 includes a configuration that, when sensing a state of the target object to be detected, and thus detecting that a movement or deformation of the object is in a predetermined state (position, posture, and shape), outputs a signal informing of this fact toward the image processing device 21 as a synchronization signal.

For example, the detection device 23 is configured by a sensor device, such as a proximity sensor, a capacitance sensor, a contact detection sensor, a bend sensor, or a strain sensor, or by a sensor array device. Alternatively, the detection device 23 may be configured by a sensor device, such as a photoelectric sensor, a distance sensor, or an encoder, and a processing device which processes sensing information output from the sensor device. Moreover, when a signal depending on a state of movement or deformation is output from the target object, the detection device 23 may include a configuration which senses a state of the target object by utilizing the output signal, and, based on the sensing, outputs a synchronization signal. Further, the detection device 23 may include a configuration which outputs not only the synchronization signal but also data such as various sensor values and arithmetic values thereof.

Furthermore, the detection device 23 may include a configuration which senses a state of the target object by image processing utilizing an image captured with an image sensor, and, based on the sensing, outputs a synchronization signal. Still further, the detection device 23 may include a configuration which calculates a similarity between an image of the target object, and a reference image (e.g., a representation image described later) representing a state of movement of the object, and outputs a synchronization signal when the similarity becomes higher than a threshold value. Yet further, the detection device 23 may include a configuration which outputs not only a synchronization signal but also a value or data calculated by image processing such as a similarity of an image. In this way, the detection device 23 may include a configuration utilizing an image of a target object. In this case, the detection device 23 may be incorporated in the image device 24.

The storage 22 is a device which stores information (data). In the second example embodiment, the storage 22 stores image data or the like used by the image processing device 21.

As represented in FIG. 4, the image processing device 21 includes a capture control unit 211, a representation selection unit 212, a displacement analysis unit 213, a reference selection unit 214, an image analysis unit 215, and a write unit 216. The displacement analysis unit 213 is connected to the capture control unit 211, the representation selection unit 212, and the reference selection unit 214, respectively. The image analysis unit 215 is connected to the capture control unit 211 and the reference selection unit 214, respectively.

The capture control unit 211 is connected to the detection device 23 and the image device 24, respectively. The capture control unit 211 includes a function of receiving a synchronization signal (a signal depending on a state of movement or deformation of the target object) from the detection device 23, and outputting, to the image device 24, a capture control signal instructing to capture an image based on the synchronization signal. For example, the capture control unit 211 may include a function of adjusting output timing of a capture control signal, in such a way as to output the capture control signal to the image device 24 after a preset delay time elapses from reception of the synchronization signal from the detection device 23. It is assumed that the delay time is, for example, a time longer than a time (response time) needed for response processing, when the capture control unit 211 immediately outputs the capture control signal on receipt of the synchronization signal. Thus, the capture control unit 211 can control capturing timing of the image device 24, in such a way as to be able to suppress an impact of variation in the response time or the like, and uniform a state of movement or deformation of an observation target object captured by the image device 24.

The capture control unit 211 also includes a function of outputting, to the representation selection unit 212, an image (captured image) acquired from the image device 24, and outputting the captured image to the displacement analysis unit 213 and the image analysis unit 215 as a processing target image.

The representation selection unit 212 includes a function of determining whether an image (representation image) used as a criterion image in the processing of the displacement analysis unit 213 is stored with the storage 22, when receiving the image (captured image) captured by the image device 24 through the capture control unit 211. Moreover, the representation selection unit 212 includes a function of storing the captured image, received through the capture control unit 211, of the image device 24 with the storage 22 as the representation image, when the representation image is not stored with the storage 22. Alternatively, the representation selection unit 212 includes a function of sequentially receiving captured images of the image device 24, and selecting, by a predetermined selection scheme, the representation image used as a criterion image in the processing of the displacement analysis unit 213, from among a plurality of preset captured images. Various schemes are conceivable for a scheme of selecting the representation image.

While any scheme may be adopted, one example thereof is described next. For example, the representation selection unit 212 determines, as a primary representation image, an image, for example, randomly selected from among a plurality of captured images captured by the image device 24, analyzes displacement between the primary representation image and another captured image, and thus calculates a displacement amount. Thereafter, the representation selection unit 212 statistically evaluates the displacement amount, and selects, as the representation image, an image taking a medium value of the displacement amount. Selecting the representation image by such a scheme can narrow a search region of displacement in processing by the displacement analysis unit 213.

The write unit 216 includes a function of writing information (data) such as an image into the storage 22. A representation image selected by the representation selection unit 212 is written into the storage 22 by the function of the write unit 216.

The displacement analysis unit 213 includes a function of performing a displacement analysis of analyzing how much a point or a region, where an object in the processing target image received from the capture control unit 211 is captured, is displaced relative to a representation image read from the storage 22. In this second example embodiment, it is assumed that the displacement analysis unit 213 mainly treats a broad displacement. The displacement analysis unit 213 calculates a displacement amount as a value indicating how much a position of an object in the processing target image is displaced relative to a representation image. The displacement analysis unit 213 also includes a function of outputting the calculated displacement amount to the reference selection unit 214.

For an analysis of displacement executed by the displacement analysis unit 213, it is possible to utilize, for example, a scheme of translational displacement amount calculation by a gradient method disclosed in Japanese Unexamined Patent Application Publication No. 2006-33142, or a scheme of calculating a motion amount by optical flow disclosed in Japanese Unexamined Patent Application Publication No. 2009-77363. Moreover, for the analysis of displacement, there are also schemes such as a scheme of tracking a movement amount by template matching, a scheme of calculating a displacement amount by an image correlation method, and a motion analysis scheme for a local image feature represented by a scale invariant feature transform (SIFT) feature amount. The displacement analysis unit 213 analyzes displacement by a scheme suitably selected from among various such schemes.

Figure 5:
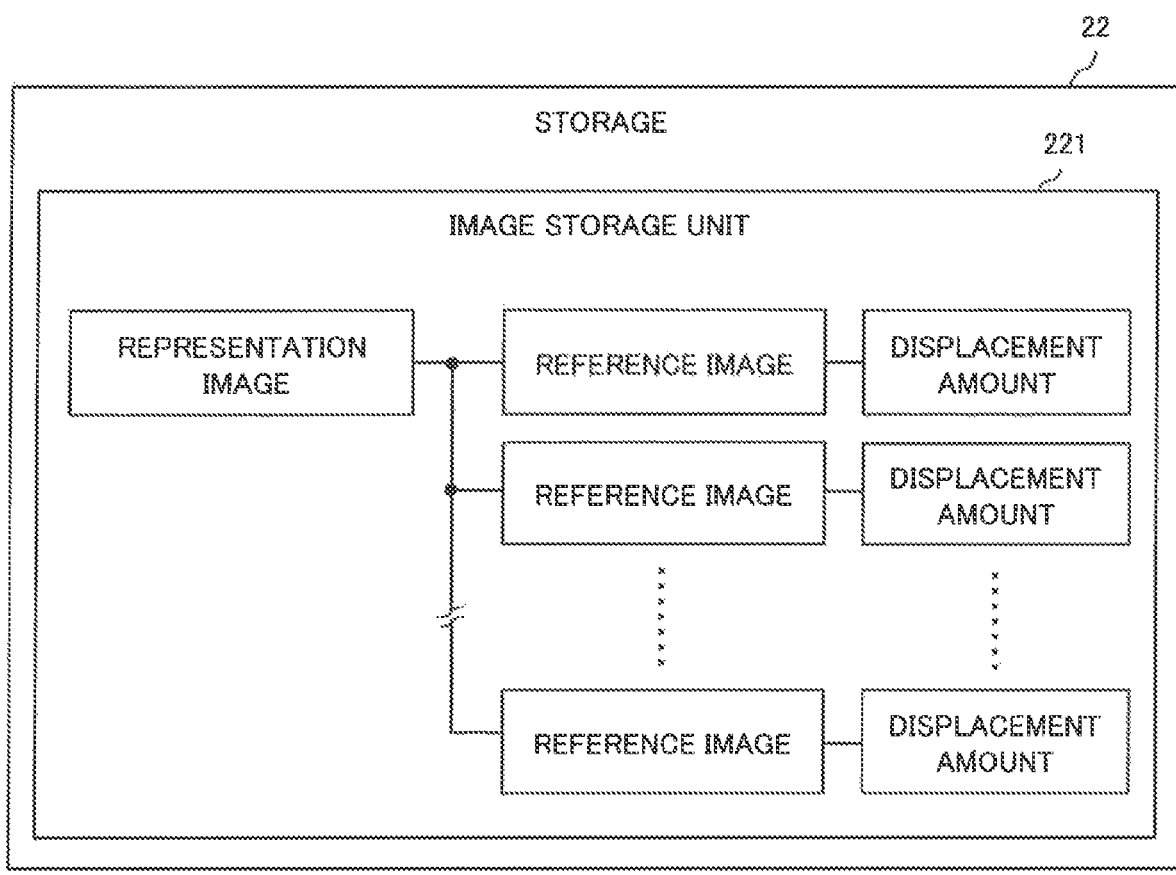
FIG. 5 is a diagram illustrating one example of information stored with a storage according to the second example embodiment.

The reference selection unit 214 selects the reference image from among a plurality of reference images stored in the storage 22 based on the displacement amount obtained from the displacement analysis unit 213. The reference image is an image including an observation target object previously captured by the image device 24 at same timing (periodic timing) as timing of capturing the observation target object. For example, when the representation image is selected by the representation selection unit 212, the displacement amount between the representation image and each reference image is calculated by the displacement analysis unit 213. The storage 22 includes an image storage unit 221 as represented in FIG. 5. The representation image selected by the representation selection unit 212, a reference image and the displacement amount between the reference image and the representation image are stored in the image storage unit 221 in an associated state.

The reference selection unit 214 selects the reference image being associated with the displacement amount closest to the displacement amount between the processing target image and the representation image calculated by the displacement analysis unit 213, from the image storage unit 221 of the storage 22. Alternatively, instead of selecting one reference image, the reference selection unit 214 may select, as a reference image group, a plurality of the reference images close to the displacement amount between the processing target image and the representation image calculated by the displacement analysis unit 213.

The image analysis unit 215 includes a function of detecting (observing) motion or the like of the observation target object by an image analysis, by use of the processing target image received through the capture control unit 211, and the reference image selected by the reference selection unit 214. The image analysis unit 215 analyzes local displacement of the observation target object in an image, for example, by a displacement analysis scheme as described above. Alternatively, the image analysis unit 215 may analyze displacement of the whole image. Moreover, the image analysis unit 215 may take a difference between images. Further, the image analysis unit 215 may extract an edge of the observation target object, and may evaluate an angle, length, or the like of the edge. Still further, the image processing device 21 may include a function of also acquiring information obtained during capture together with an image based on the synchronization signal output by the detection device 23. Then, the image analysis unit 215 may analyze motion or the like of the observation target object in consideration of the information obtained during capture as well. Information obtained during capture herein includes, for example, a capture time of an image, capture environment information (illuminance, a wind direction, a wind speed, and the like during capture), and information (a similarity of an image or the like) obtained from the detection device 23. Moreover, information obtained during capture may be a sensor value obtained during capture from various sensors (a photoelectric sensor, a distance sensor, an acceleration sensor, a gyro, and the like) placed in order to sense presence or a state of the observation target object, or an arithmetic value thereof. Information obtained during capture and used by the image processing device 21 and the image analysis unit 215 is not limited to one of the pieces of information as described above, and a plurality of pieces of information obtained during capture may be utilized.

Based on, for example, a change in motion of an object analyzed by the image analysis unit 215 as described above, whether, for example, a rotary and movable member in a factory line, facility equipment, or the like is abnormal is determined. Note that how a result of an image analysis by the image analysis unit 215 is processed is determined depending on a system to which the image processing system according to the second example embodiment is applied, and is not limited to detection of the abnormality of a member as described above.

Figure 6:
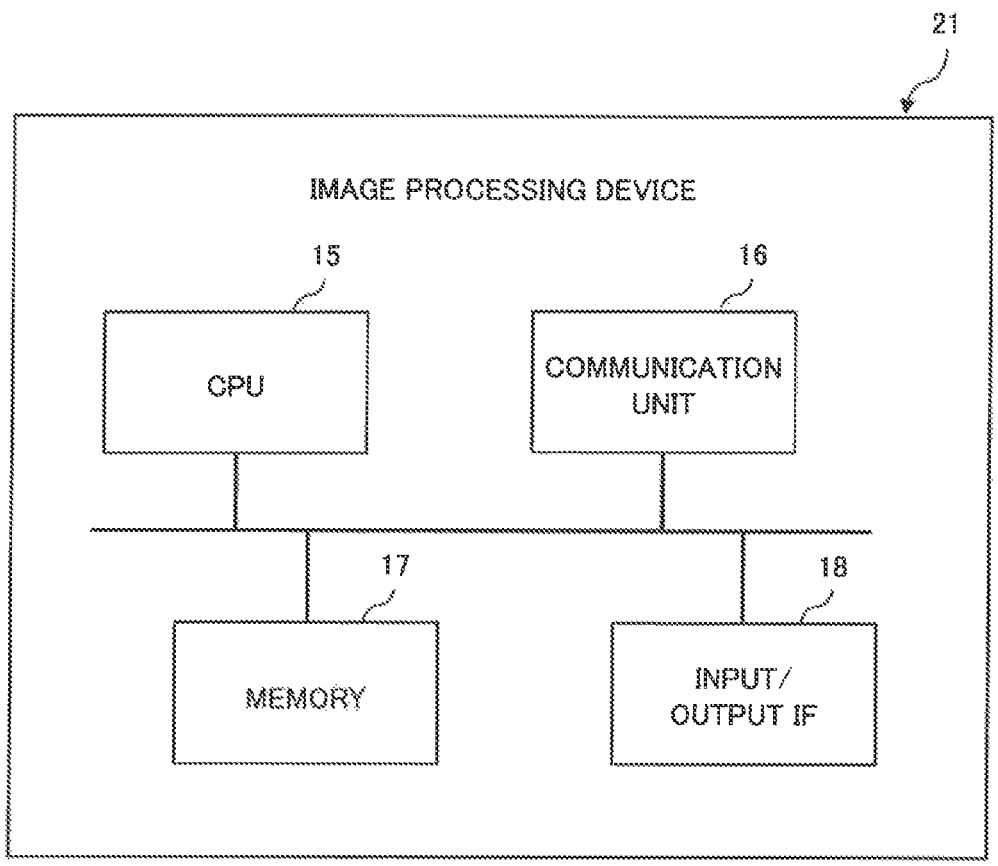
FIG. 6 is a diagram illustrating a hardware configuration of the image processing device according to the second example embodiment.

The image processing device 21 and the image processing system 20 including the same according to the second example embodiment are configured as described above. Note that FIG. 6 is a block diagram representing a hardware configuration of the image processing device 21, in a simplified form. The image processing device 21 includes, for example, a central processing unit (CPU) 15, a communication unit 16, a memory 17, and an input/output interface (IF) 18. A display device (not illustrated) may be further connected to the image processing device 21.

The communication unit 16 is connected to, for example, an information processing device (not illustrated) and the like owned by a user of a system via an information communication network (not illustrated), and includes a function of achieving communication with the information processing device and the like. The input/output IF 18 is connected to, for example, the detection device 23, the image device 24, the storage 22, and an input device (not illustrated) such as a keyboard with which an operator (user) of the device inputs information, and includes a function of achieving communication of information (a signal) with the devices. The memory 17 is a storage (storage medium) saving data and a computer program (program). There are various kinds of storages such as a hard disk device, a solid state drive (SSD), and a random access memory (RAM), and a plurality of kinds of storages are mounted on one device in some cases. However, herein, a storage is comprehensively represented as one memory. The CPU 15 is an arithmetic circuit, and includes a function of controlling operation of the image processing device 21 by reading a program saved in the memory 17 and executing the program. For example, the CPU 15 executes a program, and thereby, the capture control unit 211, the representation selection unit 212, the displacement analysis unit 213, the reference selection unit 214, the image analysis unit 215, and the write unit 216 which are functional units are achieved.

Figure 7:
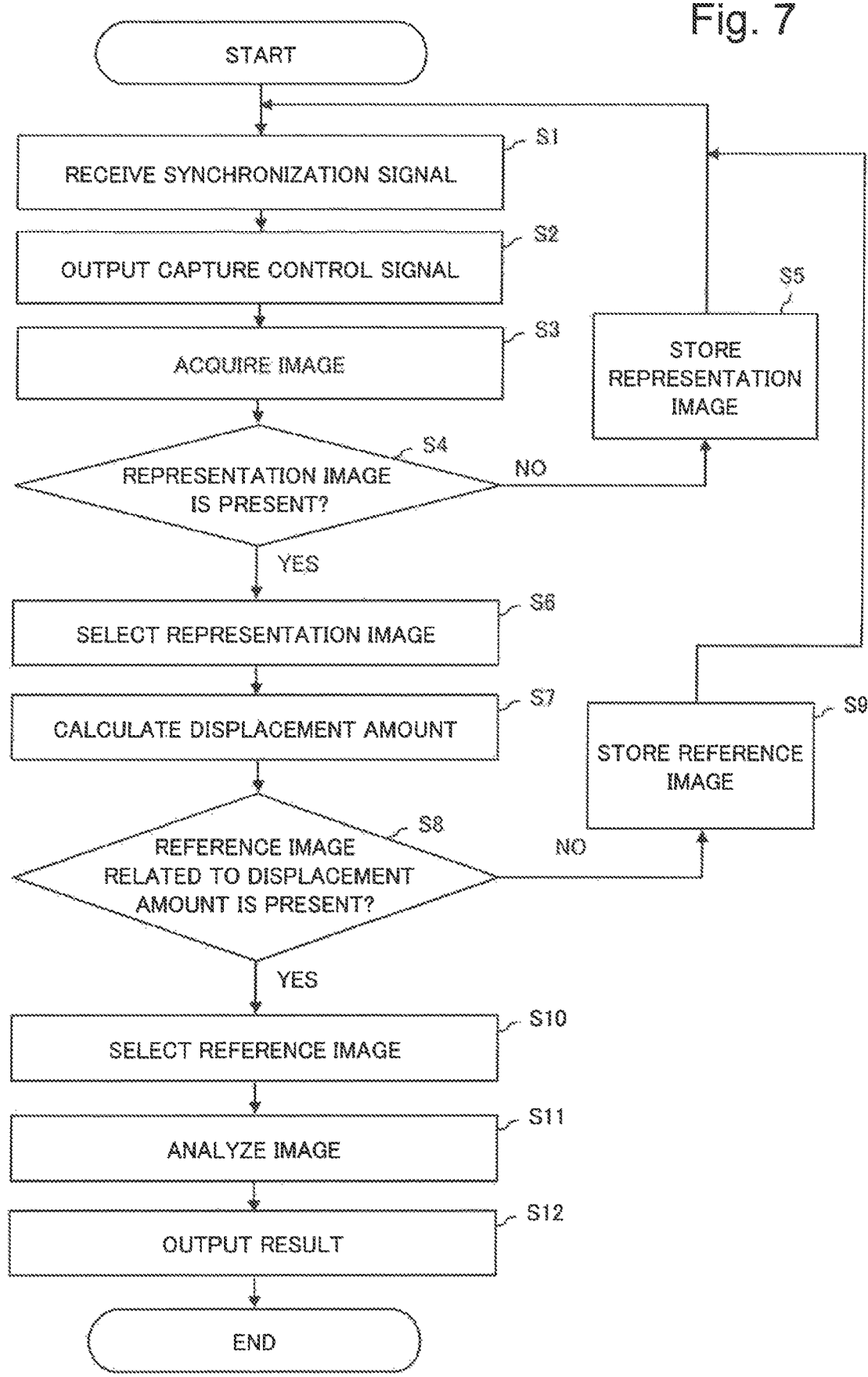
FIG. 7 is a flowchart illustrating an example of an operation example of the image processing device according to the second example embodiment.

Next, an operation example of the image processing device 21 is described based on a flowchart of FIG. 7. Note that the flowchart of FIG. 7 represents, for example, a processing procedure executed by the CPU 15 of the image processing device 21.

For example, when receiving the synchronization signal from the detection device 23 (step S1), the capture control unit 211 outputs the capture control signal to the image device 24 (step S2). Moreover, when acquiring the image from the image device 24 (step S3), the capture control unit 211 supplies the image to the representation selection unit 212, and also outputs the image to the displacement analysis unit 213 and the image analysis unit 215, as the processing target image.

When receiving the image from the capture control unit 211, the representation selection unit 212 determines whether the representation image is present (stored) in the storage 22 (step S4). When the representation image is not present, the representation selection unit 212 writes (stores) the received image into the image storage unit 221 of the storage 22 by the write unit 216, as the representation image (step S5). Then, the image processing device 21 prepares for a next synchronization signal, and waits.

On the other hand, when the representation image is present in the image storage unit 221 of the storage 22, the representation image is selected based on a predetermined selection scheme (step S6).

Thereafter, the displacement analysis unit 213 analyzes displacement between the processing target image received from the capture control unit 211 and the representation image selected by the representation selection unit 212, and calculates the displacement amount (step S7). Then, the reference selection unit 214 determines whether the reference image being associated with the displacement amount, which is the same as the calculated displacement amount or is within a predetermined displacement permissible range, is present, among reference images being associated with the representation image selected by the representation selection unit 212, in the image storage unit 221 (step S8). When the associated reference image is not present in the image storage unit 221, the reference selection unit 214 determines, as a reference image, the captured image by the image device 24 which is a processing target for the displacement analysis unit 213. Then, the reference selection unit 214 stores, by the write unit 216, the reference image with the reference image storage unit 122, in a state of being associated with the displacement amount calculated by the displacement analysis unit 213 (step S9). Then, the image processing device 21 prepares for a next synchronization signal, and waits.

On the other hand, when the representation image related to the displacement amount calculated by the displacement analysis unit 213 is present in the image storage unit 221, the reference selection unit 214 selects the related reference image (step S10), and reads the selected reference image from the image storage unit 221.

Subsequently, the image analysis unit 215 analyzes an image by use of the processing target image received from the capture control unit 211 and the reference image selected by the reference selection unit 214 (step S11). Then, the image analysis unit 215 outputs a result obtained by the analysis, for example, an observation result of motion or the like of the observation target object to an unillustrated output device (step S12).

The image processing device 21 can observe motion or the like of the observation target object by a series of operations including the image processing as described above, and can output an observation result to the display device (not illustrated).

The image processing device 21 and the image processing system 20 including the same according to the second example embodiment can obtain the following advantageous effect. Specifically, in the second example embodiment, as represented in FIG. 5, a plurality of the reference images are associated with one representation image, further, the displacement amount of each reference image from the representation image is calculated, and each calculated displacement amount is associated with the reference image. In such a state, the representation image, the reference image, and the displacement amount are saved in the image storage unit 221. The representation image and the reference image are also both images in which the observation target object is captured under a same condition as an analysis target captured image output from the image device 24. Thus, the reference image selected by the reference selection unit 214 based on the displacement amount between the representation image of being criterion and the captured image of being analysis target (processing target image) from among the reference images saved in the image storage unit 221, is an image being easy to compare with the processing target image. In other words, the displacement analysis unit 213 can extract a component resulting from variation in capturing timing between the processing target image and the representation image, as a parameter referred to as the displacement amount. Then, from among the reference images in the image storage unit 221 being associated with the displacement amounts indicating variation components of capturing timing from the same representation image, the reference selection unit 214 can select the reference image being close in the displacement amount. The reference image being close in the displacement amount is specifically the reference image having a small variation component of capturing timing from the processing target image and being easy to compare with the processing target image. As a result of selection of such the reference image, the image analysis unit 215 can compare the observation target object in the processing target image with the observation target object in the reference image being in a position and a posture similar to those of the object, even when a position of an object in an image varies due to variation in capturing timing. Consequently, a position, a posture, and the like of the observation target object in the processing target image have a small displacement from those of the observation target object in the reference image, and it becomes easier for the image analysis unit 215 to extract behavior that needs to be observed in the observation target object.

Furthermore, instead of variation in capturing timing, there is a case where a capturing position of an object in an image displacements when a movement speed of an object changes. In this case as well, the reference selection unit 214 can suitably select the reference image including the observation target object being easy to compare with the observation target object in the processing target image. Thus, even when a movement speed of the object changes, the image analysis unit 215 can easily extract behavior that needs to be observed in the observation target object by an image analysis based on the comparison between the processing target image and the reference image.

Thus, with a simple configuration, the image processing device 21 and the image processing system 20 including the same can reduce an adverse impact of variation in capturing timing with respect the detection for detecting motion of the object, and detect (observe), by an image analysis and with precision, motion of an object captured without stopping motion of the object in motion.

<Modification Examples of Second Example Embodiment>

MODIFICATION EXAMPLE 1

Figure 8:
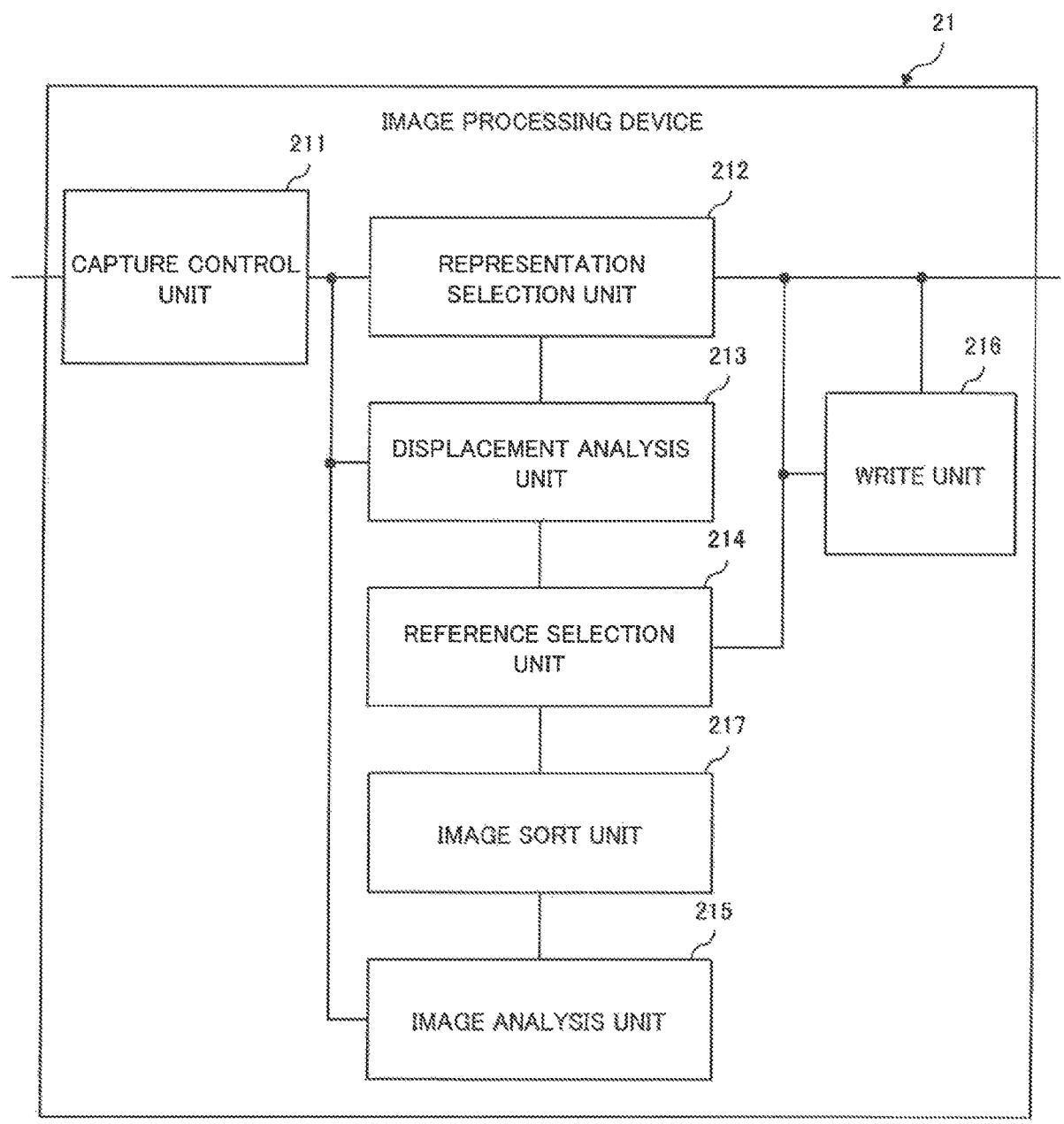
FIG. 8 is a block diagram representing simply a configuration of one modification example of the image processing device according to the second example embodiment.

FIG. 8 is a block diagram representing simply a configuration of a modification example of the image processing device 21 in the second example embodiment. Note that, in FIG. 8, a same reference sign is given to a part having a same name as a constituent part constituting the image processing device 21 represented in FIG. 4, and a repeated description of a common part in a function of the part is omitted.

In this modification example, an image sort unit 217 being a functional unit achieved by, for example, the CPU 15 is provided in addition to the configuration of the image processing device 21 represented in FIG. 4. In this modification example, for example, the reference selection unit 214 selects, as a reference image group, a plurality of the reference images close to the displacement amount between the processing target image and the representation image calculated by the displacement analysis unit 213. Moreover, the image sort unit 217 includes a function of sorting the plurality of selected reference images in accordance with a predetermined rule. Based on the reference images sorted by the image sort unit 217 and the processing target image, the image analysis unit 215 extracts motion or the like of the observation target object by an image analysis.

Components of the image processing device 21 represented in FIG. 8 other than the above-described components are similar to components of the image processing device 21 represented in FIG. 4.

MODIFICATION EXAMPLE 2

Figure 9:
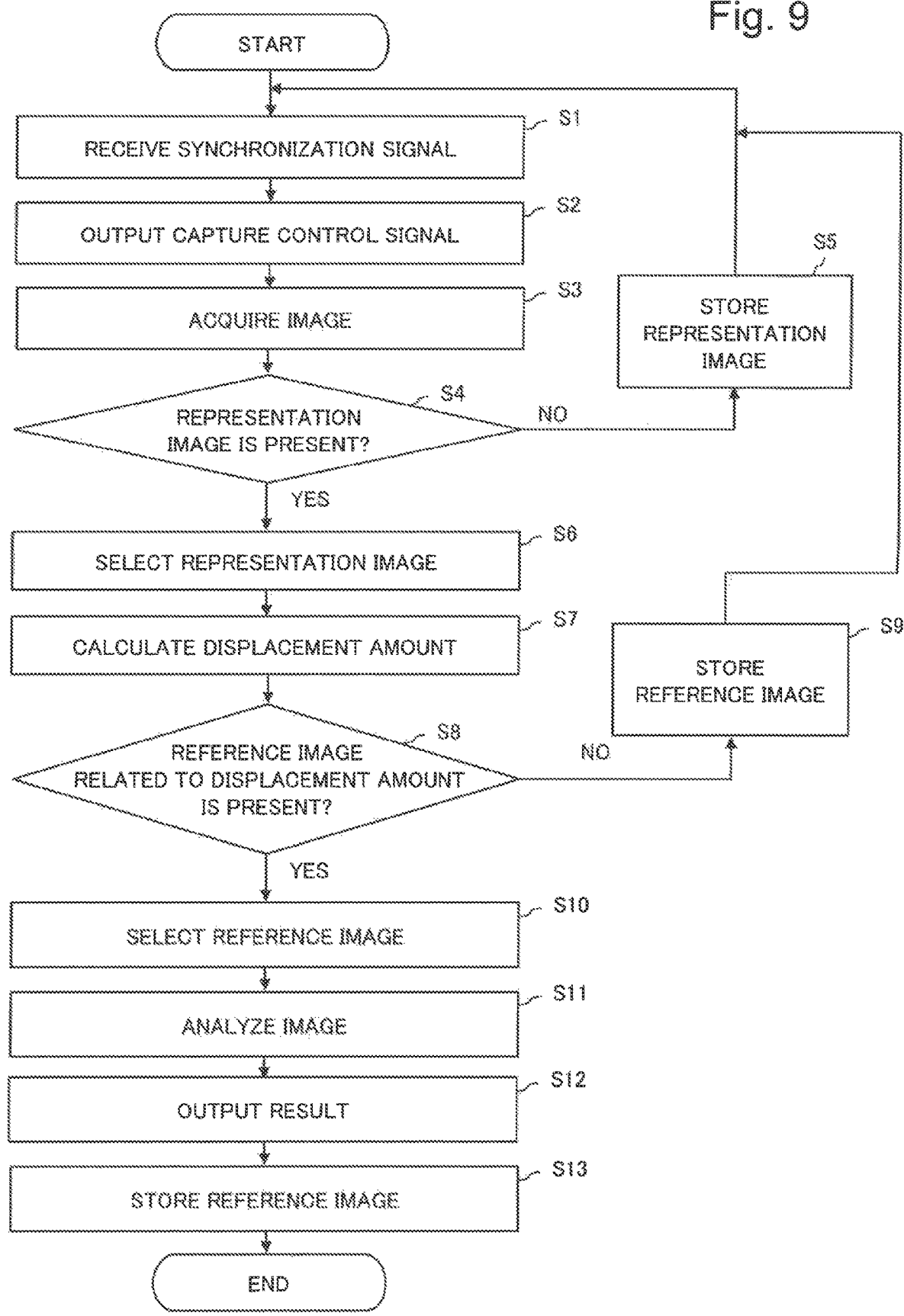
FIG. 9 is a flowchart illustrating a modification example of the operation of the image processing device according to the second example embodiment.

FIG. 9 is a flowchart representing a modification example of an operation example in the image processing device 21 in FIG. 8. Although operations in the step S1 to the step S12 are similar, in the operation example in the image processing device 21 represented in FIG. 9, to the operations in the step S1 to the step S12 in FIG. 7, an operation of storing the reference image with the storage 22 is performed after the operation in the step S12 (step S13). In other words, in the step S13, after the image analysis unit 215 outputs an analysis result, the reference selection unit 214 outputs, as a new reference image, the processing target image to the write unit 216, in the state of being associated with the displacement amount calculated by the displacement analysis unit 213. Thereby, the new reference image, and information on the displacement amount between the reference image and the representation image are written (updated) into the image storage unit 221 of the storage 22 by the write unit 216.

By performing such the operation (having the function), the image processing device 21 can suitably accumulate the reference images.

MODIFICATION EXAMPLE 3

Figure 10:
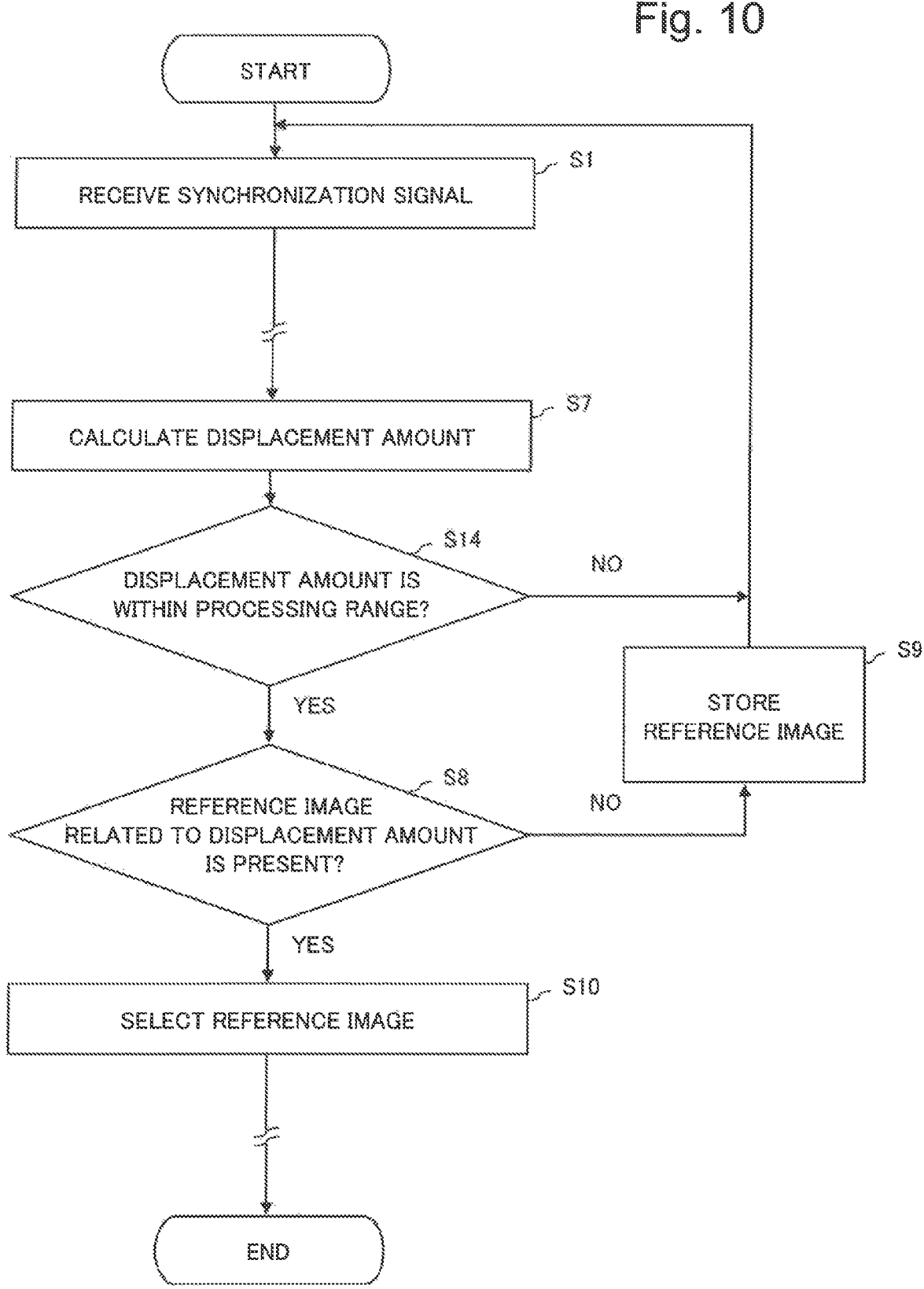
FIG. 10 is a flowchart illustrating another modification example of the operation of the image processing device according to the second example embodiment.

FIG. 10 is a flowchart representing another modification example of an operation in the image processing device 21. In the example of FIG. 10, after the operation (step S7) in which the displacement analysis unit 213 calculates the displacement amount of the processing target image from the representation image, the reference selection unit 214, for example, performs an operation (step S14) of determining whether the calculated displacement amount is within a preset processing range. Then, the image processing device 21 executes operations in and after the step S8 when the displacement amount is within the processing range, or the image processing device 21 prepares for reception of a next synchronization signal and waits when the displacement amount is more than the processing range. In the operation example represented in FIG. 10, operations other than the above-described operations are similar to the operations represented in FIG. 7 or FIG. 9, and the same step number is given to a similar operating part, further illustration thereof is omitted accordingly, and furthermore a repeated description of a common part of the similar operating part is omitted.

In this operation example, the reference selection unit 214 becomes able to select the processing target image, and the processing target image in which the displacement amount calculated by the displacement analysis unit 213 is within an appropriate processing range is turned to processing at a subsequent stage. Therefore, the image analysis unit 215 more easily compares with the reference image, and can enhance precision of an image analysis. Moreover, when the reference images can be accumulated in the image storage unit 221 as in the operation example of FIG. 9, the processing target images having appropriate the displacement amounts are accumulated as the reference images. Further, in this case, a speed of accumulation of the reference images in the image storage unit 221 becomes slower than when the processing target image is not selected. Thus, even when the storage 22 such as a random access memory (RAM) having a small storage capacity is used, a configuration which accumulates reference images can be applicable.

Figure 11:
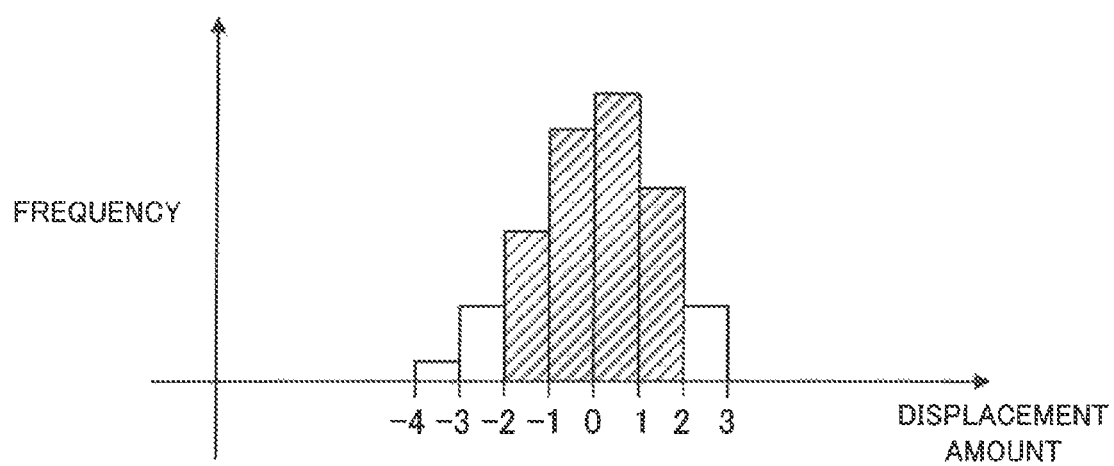
FIG. 11 is a graph representing an example of a relation between a displacement amount and an appearance frequency (count).

FIG. 11 represents, by a bar graph, an example of a relation between the displacement amount of the processing target image from the representation image, and an appearance frequency (count) of the processing target image related to the displacement amount. Note that the displacement amount is divided into predetermined displacement amounts, and the appearance frequency of the processing target image in each division is represented in FIG. 11.

For example, when the processing target image is selected as in the operation example of FIG. 10, the processing target images corresponding to shaded appearance frequencies in FIG. 11 are selected, in the case where the displacement amount is in a processing range of "−2" to "2" in FIG. 11. As represented in this drawing, compared to a case where the processing target image is not selected, a number of the processing target images to be processed by the reference selection unit 214 and the image analysis unit 215 is reduced by selecting the processing target image. Consequently, when the processing target image processed by the image analysis unit 215 is saved in the storage 22 as the reference image, the configuration which selects the processing target image can suppress an accumulation amount of the reference images.

Note that, when a processing range used in processing of selecting the processing target image is sufficiently decreased, it is possible to eliminate the need for the processing in the step S8 and the step S9. In this case, the image processing device 21 can process at a higher speed, can reduce the reference images to be recorded on the image storage unit 221, and is therefore applicable even when the storage 22 having a smaller storage capacity is used.

MODIFICATION EXAMPLE 4

In the second example embodiment, it is described that the representation selection unit 212 is configured to set (select) the representation image from among the captured images received through the capture control unit 211. Instead, the representation selection unit 212 may set (select) the representation image from among the reference images in the storage 22, when the reference images are stored in the storage 22.

MODIFICATION EXAMPLE 5

Furthermore, in addition to the configuration (function) according to the second example embodiment, the image processing device 21 may include a configuration which updates the representation image at preset timing. For example, the following scheme is conceivable as a scheme of setting (selecting) the representation image to be updated. For example, it is possible to conceive a scheme of selecting, as the representation image, the reference image related to a medium value or an average value among the displacement amounts of respective reference images from the representation image stored with the image storage unit 221 of the storage 22. By selecting the representation image in this way, a displacement between the representation image and the processing target image is decreased. Therefore, such a configuration which selects the representation image can reduce a load of processing of calculating the displacement amount between the representation image and the processing target image, and can speed up a processing.

Note that, when the representation image is updated, it is necessary to calculate the displacement amount of the reference image from the updated representation image, and re-store, with the image storage unit 221 of the storage 22, information (data) associating the reference image and the calculated displacement amount with the updated representation image.

MODIFICATION EXAMPLE 6

Furthermore, a plurality of the representation images may be each stored with the image storage unit 221 in a state of being associated with the reference image and the displacement amount. In this case, the displacement analysis unit 213 may calculate the displacement amount between each of a plurality of the representation images and the processing target image. Moreover, the reference selection unit 214 may select the reference image related to the calculated displacement amount, from among the reference images being associated with respective representation images for which the displacement amounts are calculated. In such a case, the image analysis unit 215 can perform an image analysis by comparing a plurality of the reference images captured at different timings with one processing target image.

MODIFICATION EXAMPLE 7

Furthermore, the reference selection unit 214 may select a plurality of the reference images, as a reference image group, from the image storage unit 221. For example, the reference selection unit 214 calculates a preset range of width around the displacement amount of the processing target image from the representation image (e.g., a range from a value (P−β) in which a predetermined value β is subtracted from a displacement amount P to a value (P+β) in which the predetermined value β is added to the displacement amount P). Then, the reference selection unit 214 selects, as the reference image group, the reference images being associated with the displacement amounts within the range.

MODIFICATION EXAMPLE 8

Figure 12:
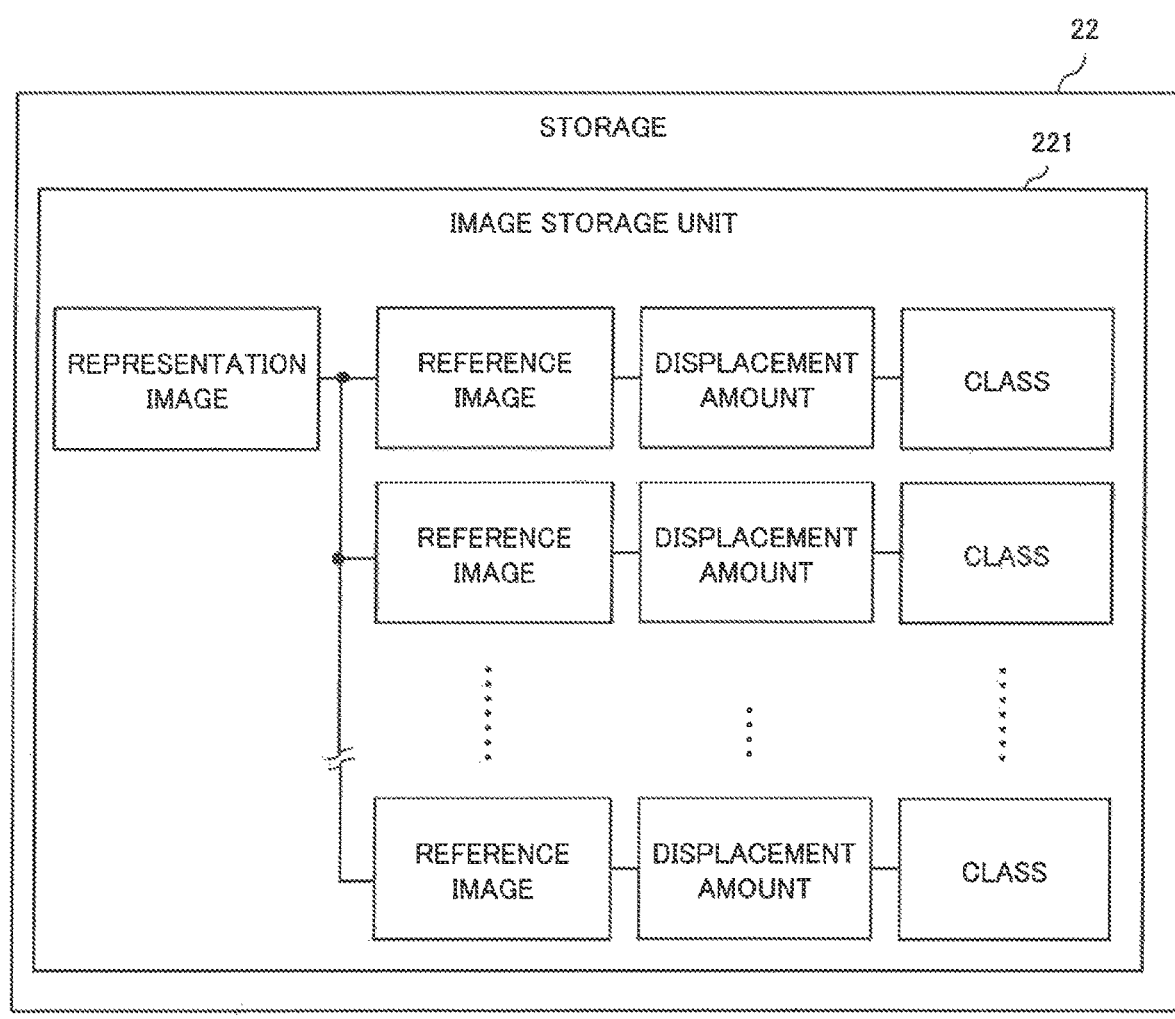
FIG. 12 is a diagram illustrating a modification example of information stored with the storage in the second example embodiment.

Furthermore, the displacement amounts may be divided into a plurality of classes, and the reference image may be classified into one of the classes based on the displacement amount of the reference image from the representation image. In this case, as represented in FIG. 12, with the reference image stored with the image storage unit 221, information on a class into which the reference image is classified in such a way is also associated. Moreover, the reference selection unit 214 may determine based on the displacement amount calculated by the displacement analysis unit 213, which class the processing target image belongs to, and may select all reference images belonging to a same class as the class to which the processing target image is determined to belong.

The reference selection unit 214 selects the reference image group by the processing in Modification Example 7 and Modification Example 8, and thereby, a plurality of the reference images close to the processing target image can be obtained. Therefore, a more precise image analysis result can be obtained by the image analysis unit 215.

Note that the predetermined value β in Modification Example 7 and a range of each class of the displacement amount in Modification Example 8 may be set depending on magnitude of motion which needs to be observed. For example, in Modification Example 8, when a range of a class of each displacement amount is α, and magnitude of motion which needs to be observed is γ, the range of the class may be set in such a way that γ>α. In this case, because displacement width between a plurality of the reference images used for processing in the image analysis unit 215 is smaller than the magnitude γ of motion which needs to be observed, an impact of displacement width between a plurality of the reference images is small, and the image analysis unit 215 can easily detect (observe) motion γ which needs to be observed.

MODIFICATION EXAMPLE 9

Figure 13:
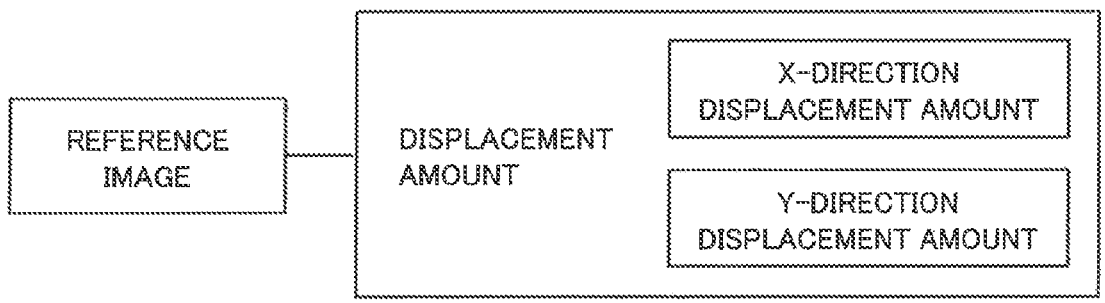
FIG. 13 is a diagram illustrating another modification example of information stored with the storage in the second example embodiment.

Furthermore, information on the displacement amount being associated with the reference image stored with the image storage unit 221 of the storage 22 may include information on a plurality of the displacement amounts different from each other, such as, for example, "displacement amount in a movement direction of an object" and "displacement amount in a direction perpendicular to movement of an object". For example, when the movement direction of the observation target object is an X-direction, and a direction perpendicular to the movement direction is a Y-direction, information on the displacement amount being associated with the reference image includes information on an X-direction displacement amount and information on a Y-direction displacement amount, as represented in an image diagram in FIG. 13.

In such a case, for example, the displacement analysis unit 213 obtains the X-direction displacement amount and the Y-direction displacement amount of the processing target image from the representation image, and the reference selection unit 214 selects the reference image based on the calculated X-direction and Y-direction displacement amounts. By an image analysis based on the reference image selected in such a way and the processing target image, the image analysis unit 215 can detect (observe) motion (behavior) or the like of the observation target object with better precision.

Moreover, generally, when an image is captured in a state where an object is in motion, "component of a displacement amount in a movement direction of an object" tends to be greater than "component of a displacement amount in a direction perpendicular to movement of an object". Thus, for example, the displacement analysis unit 213 calculates the displacement amount in view of "component of a displacement amount in a movement direction of an object", and cuts off other impacts. Thereby, the reference selection unit 214 can select the reference image suited to the processing target image in view of a movement direction of an object.

MODIFICATION EXAMPLE 10

Figure 14:
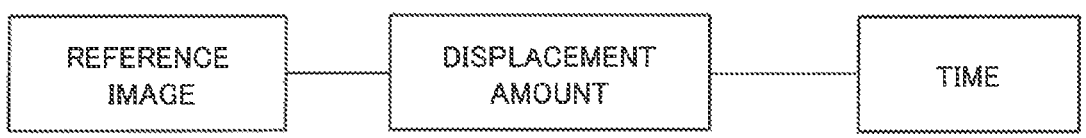
FIG. 14 is a diagram illustrating still another modification example of information stored with the storage in the second example embodiment.

Furthermore, not only information on the displacement amount from the representation image, but also, for example, information on a capture time being information obtained during capture of the reference image may be associated with the reference image stored with the image storage unit 221 of the storage 22, as represented in FIG. 14. Moreover, information regarding processing in the image processing device 21 that calculation of the displacement amount failed may be associated with the reference image, as information obtained during capture.

Figure 15:
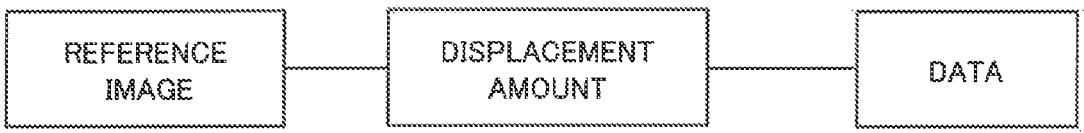
FIG. 15 is a diagram illustrating yet another modification example of information stored with the storage in the second example embodiment.

Additionally, data as information obtained during capture may be associated with the reference image stored with the image storage unit 221 of the storage 22, as represented in an image diagram of FIG. 15. Information obtained during capture herein includes, for example, the capture time of an image, capture environment information (illuminance, a wind direction, a wind speed, and the like during capture), and information (a similarity of an image and the like) obtained from the detection device 23. Moreover, information obtained during capture may be a sensor value obtained during capture from various sensors (a photoelectric sensor, a distance sensor, an acceleration sensor, a gyro, and the like) placed in order to sense presence or a state of the observation target object, or an arithmetic value thereof.

When one piece or a plurality of pieces of information obtained during capture as described above are associated with the reference image as data, a configuration is assumed in which similar data are associated with the processing target image processed in the reference selection unit 214. Then, by utilizing not only the displacement amount but also such data, the reference selection unit 214 selects the reference image. Thereby, the reference selection unit 214 can select the reference image more suited to the processing target image. By sorting and analyzing the processing target images utilizing such data being associated with the processing target image, the image analysis unit 215 can detect (observe), for example, an impact of a time-series change, an impact of an illuminance change, and the like. To describe more specifically, for example, the image analysis unit 215 becomes able to analyze a more detailed change of behavior of an observation target object, by a comparison between the processing target images close in capture times or between the reference images. Moreover, by comparing images similar in capture illuminance, the image analysis unit 215 becomes able to analyze motion of the observation target object in a state where an impact of a difference of illuminance is reduced. By performing an image analysis in consideration of information obtained during capture, the image analysis unit 215 also becomes able to analyze a factor of occurrence of a matter which needs to be observed in the observation target object.

Moreover, the image analysis unit 215 also becomes able to analyze motion of the observation target object based on a plurality of the processing target images selected based on a plurality of pieces of information obtained during capture, in such a way as to compare processing the target images close in capture times and similar in capture illuminance. In this way, by performing an image analysis, based on the processing target image selected in consideration of even information obtained during capture, and the reference image (i.e., an image close in a capture condition), the image analysis unit 215 becomes able to detect, more easily and with precision, a matter which needs to be observed in the observation target object.

Third Example Embodiment

A third example embodiment according to the present invention is described below. Note that, in the description of the third example embodiment, a same reference sign is given to a part having a same name as a constituent part constituting the image processing device and the image processing system according to the second example embodiment, and a repeated description of the common part is omitted.

Figure 16:
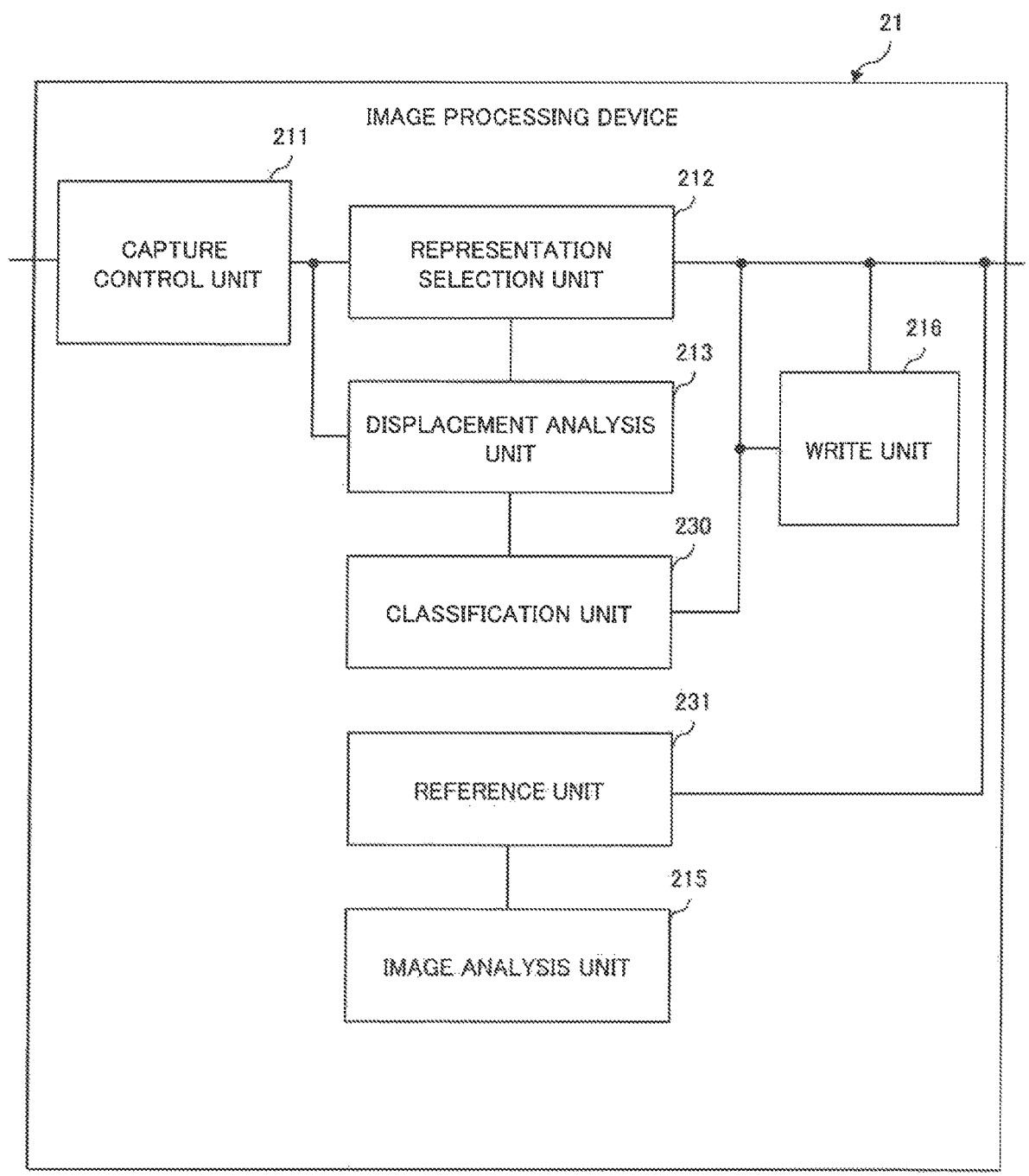
FIG. 16 is a block diagram representing simply a configuration of an image processing device in a third example embodiment according to the present invention.

FIG. 16 is a block diagram representing simply a configuration of an image processing device according to the third example embodiment. The image processing device 21 according to the third example embodiment includes a classification unit 230 and a reference unit 231 instead of the reference selection unit 214 in the second example embodiment.

The classification unit 230 includes a function of classifying a processing target image being the captured image received through the capture control unit 211 based on the displacement amount obtained from the displacement analysis unit 213. For example, as described above, the displacement amounts are divided into classes, and the classification unit 230 classifies the processing target image into one of the classes based on the displacement amount of the processing target image from the representation image.

The classification unit 230 further includes a function of outputting, to the write unit 216, the processing target image and information on the class into which the processing target image is classified, and writing, by the write unit 216, the processing target image into the storage 22 as the reference image, in a state that the processing target image is associated with the representation image and the class information.

The reference unit 231 is connected to the storage 22, and includes a function of selecting the class of the displacement amount based on a preset selection scheme, for example, when a request for reference is received from a user of the system. Various schemes are conceivable for the selection scheme. For example, the reference unit 231 selects the class of the displacement amount related to the most recent displacement amount calculated by the displacement analysis unit 213. Alternatively, the reference unit 231 selects the reference image group having a highest appearance frequency.

Further, the reference unit 231 includes a function of acquiring, from the storage 22, a plurality of the reference images belonging to the class selected in such a way.

By analyzing a plurality of the reference images acquired by the reference unit 231, the image analysis unit 215 detects (observes) motion (behavior) or the like of the observation target object.

Components of the image processing device 21 according to the third example embodiment other than the above-described components are similar to components of the image processing device according to the second example embodiment.

Figure 17:
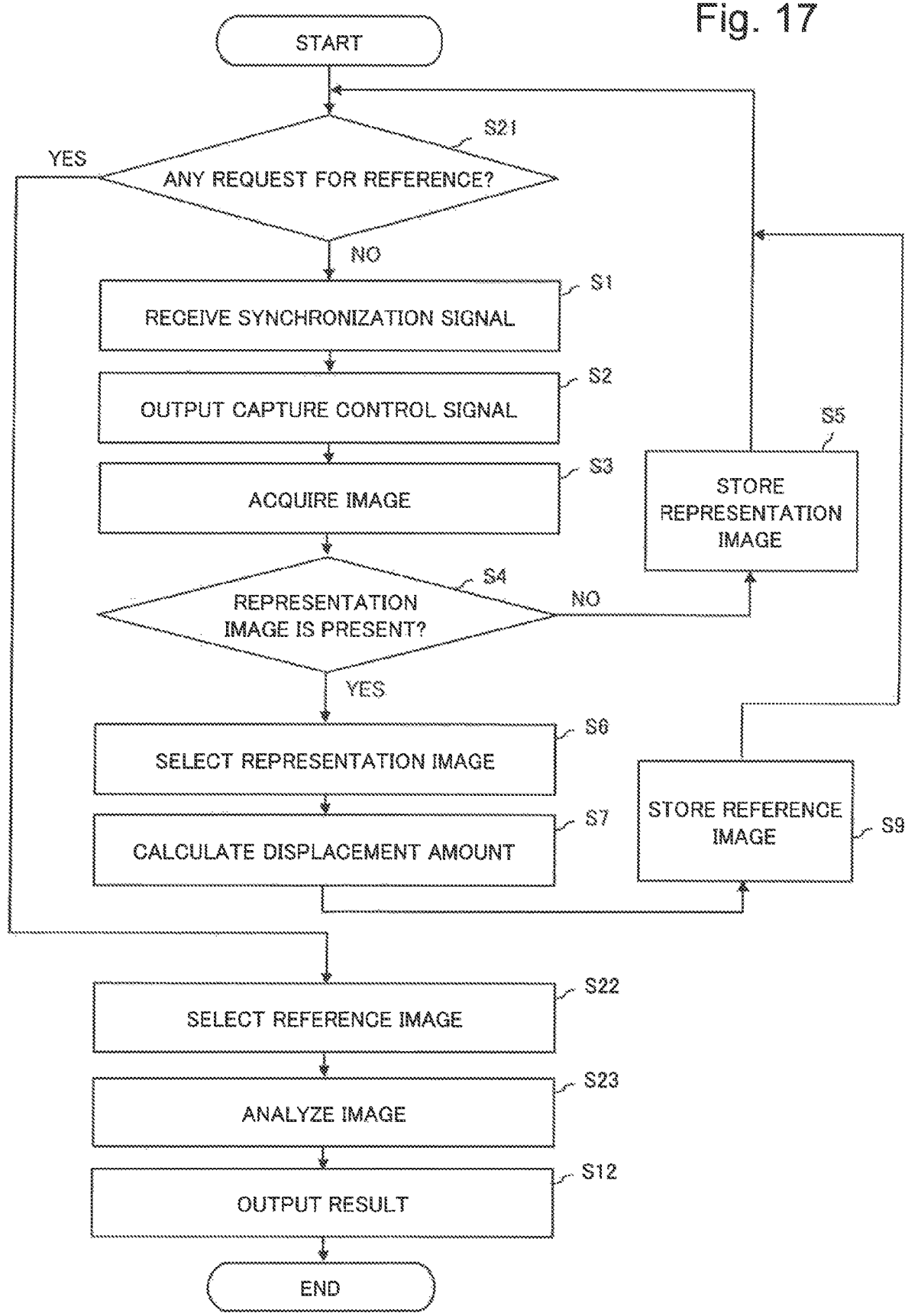
FIG. 17 is a flowchart illustrating an example of an operation of the image processing device according to the third example embodiment.

Next, an operation example of the image processing device 21 according to the third example embodiment is described based on a flowchart of FIG. 17. Note that, in FIG. 17, a same step number is given to a step of an operation similar to the operation described in the flowcharts of FIGS. 7, 9, and 10, and a repeated description of a common part therein is omitted.

In this example, an operation of the image processing device 21 is different from an operation of the image processing device 21 according to the second example embodiment in the following point. Specifically, in the third example embodiment, the image processing device 21 sequentially stores a video image (processing target image) of the observation target object captured by the image device 24 with the storage 22, as the reference image or the representation image. Then, the image processing device 21 executes image analysis processing utilizing the reference image, when there is a request for reference (refer to the operations in steps S21, S22, and S23).

Moreover, in the step S22, the image processing device 21 (reference unit 231) selects the class of the displacement amount based on a preset selection scheme, and reads a plurality of the reference images classified into the selected class, from the storage 22, as the reference image group.

Furthermore, in the step S23, the image analysis unit 215 calculates, by an image analysis, the displacement amount between the reference images for a plurality of the reference images in the read reference image group, and observes (detects) motion (behavior) or the like of the observation target object by utilizing the displacement amount.

Operations of the image processing device 21 according to the third example embodiment other than the above-described operation are similar to the operations of the image processing device 21 according to the second example embodiment.

By including the configurations as described above, the image processing device 21 and the image processing system 20 including the same according to the third example embodiment can obtain an advantageous effect described in the second example embodiment, and can also obtain the following advantageous effect. Specifically, as the reference image utilized in an image analysis for observing (detecting) motion or the like of the observation target object, the image processing device 21 according to the third example embodiment utilizes a plurality of the reference images which the displacement amounts belong to a same class. In other words, the image processing device 21 analyzes an image between the reference images having a small variation component of capturing timing, and can therefore observe motion of the observation target object in a state where the impact of the variation in capturing timing is small.

Moreover, the reference unit 231 in the image processing device 21 according to the third example embodiment can select the reference image group of the suitably selected class. Therefore, for example, it is possible to obtain many reference images having a small variation component of capturing timing, by selecting the reference image group having a highest appearance frequency. By utilizing many reference images acquired in this way, the image analysis unit 215 can detect, with high probability, motion which needs to be observed in the observation target object.

<Modification Example of Third Example Embodiment>

Figure 18:
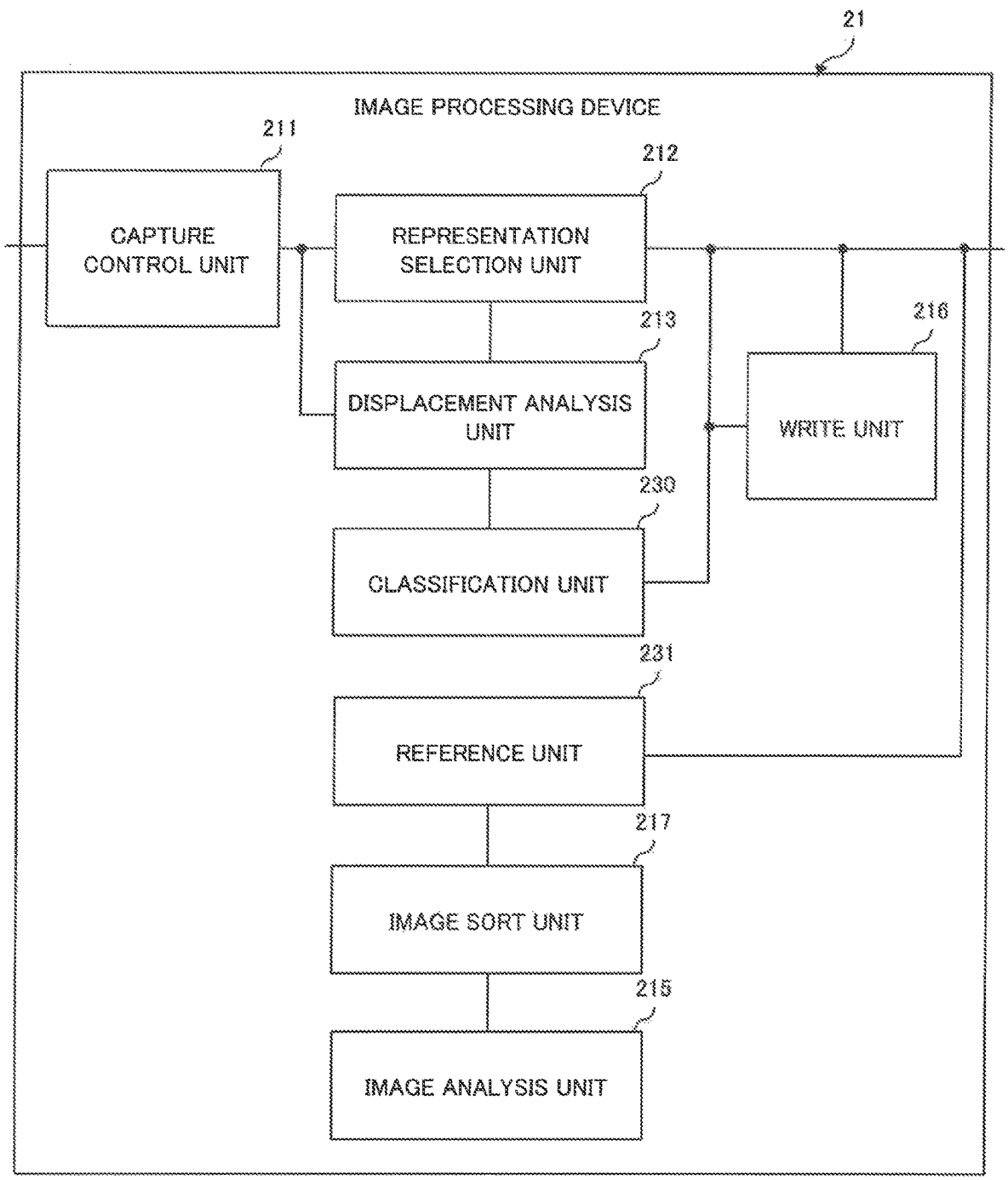
FIG. 18 is a block diagram representing simply a configuration of one modification example of the image processing device according to the third example embodiment.

Note that, as represented in FIG. 18, an image sort unit 217 may be further included in the image processing device 21, in addition to the configuration of the image processing device 21 according to the third example embodiment described above. In a way similar to the image sort unit 217 described in Modification Example 1 according to the second example embodiment, the image sort unit 217 has a function of sorting, in accordance with a predetermined rule, a plurality of the reference images belonging to the reference image group selected and acquired by the reference unit 231.

In this third example embodiment, it is also assumed that many reference images are analyzed, and thus, the configuration capable of sorting a large number of the reference images by the image sort unit 217 can suppress complication of reference images. Moreover, by suitably setting a rule (condition) of sorting, the image analysis unit 215 becomes able to detect, more easily and with precision, a matter which needs to be observed in the observation target object.

Furthermore, there may be provided an image analysis unit having a function of sorting a plurality of images (reference images and processing target images) based on the displacement amount in a direction (e.g., a direction perpendicular to a movement direction) different from the movement direction of the observation target object. By utilizing images sorted in such a way and a displacement amount distribution obtained by the image analysis unit 215, it becomes easy to detect, with precision, a change in motion of the observation target object and a process of the change, and visualize the same for a human being to easily understand by appearance.

Fourth Example Embodiment

A fourth example embodiment according to the present invention is described below. Note that, in the description of the fourth example embodiment, a same reference sign is given to a part having a same name as a constituent part constituting the image processing devices and the image processing systems according to the second and third example embodiments, and a repeated description of the common part is omitted.

Figure 19:
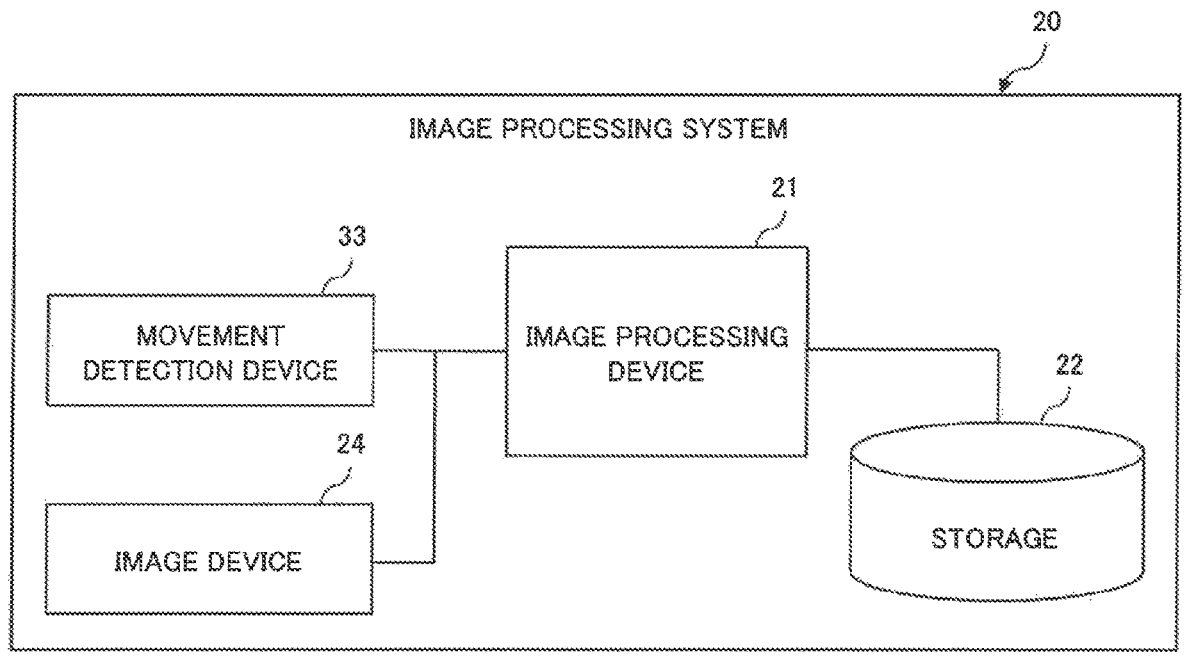
FIG. 19 is a block diagram representing simply a configuration of an image processing system in a fourth example embodiment according to the present invention.
Figure 19:
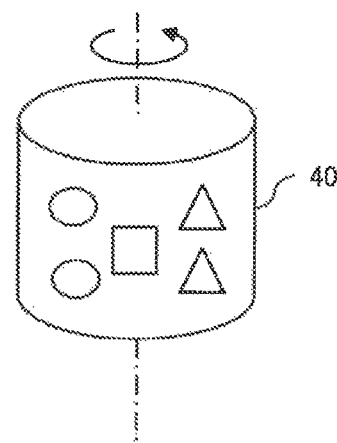

FIG. 19 is a block diagram representing simply a configuration of the image processing system 20 including the image processing device 21 according to the fourth example embodiment. In the fourth example embodiment, the image processing system 20 includes a configuration similar to those in the second and third example embodiments, but is provided with a movement detection device 33 as the detection device 23. Other than this, the configuration of the image processing system 20 is similar to the configuration of the image processing systems 20 according to the second or third example embodiment.

Figure 20:
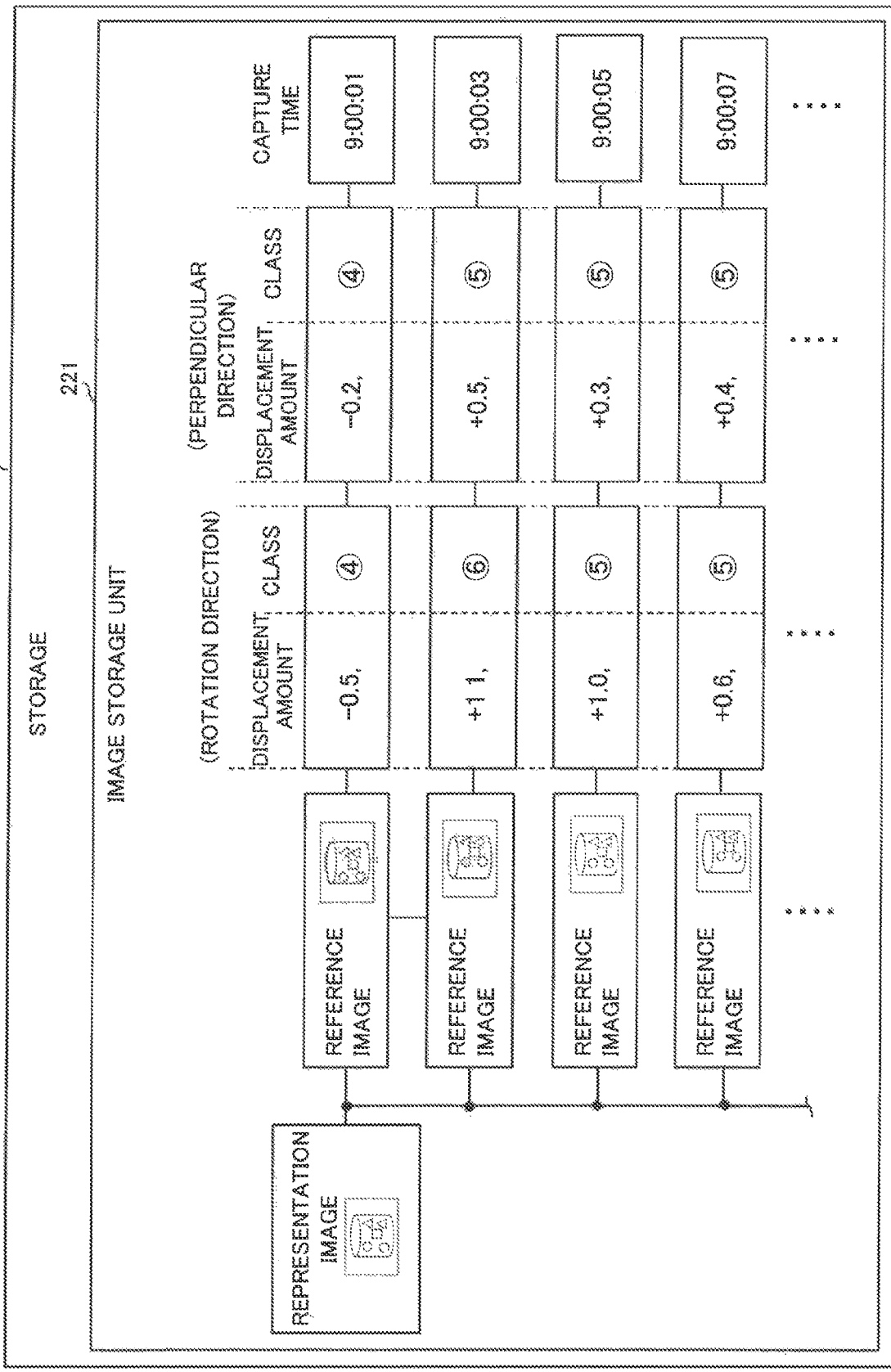
FIG. 20 is a diagram illustrating a specific example of information stored with a storage according to the fourth example embodiment.

FIG. 20 represents a specific example of information (data) stored with the image storage unit 221 in the storage 22.

In the fourth example embodiment, the movement detection device 33 as a detection device includes a function of monitoring rotation of the observation target object 40 (refer to FIG. 19), and, when detecting that the object 40 is in a predetermined rotation state, outputting the synchronization signal informing of this fact.

A plurality of the reference images, the displacement amounts thereof, classes of the displacement amounts, capture times, and the like are stored in the image storage unit 221 in association with one representation image. Note that a number of representation images is not exclusively one, and may be more than one. Moreover, the storage 22 is configured by a hard disk device or a solid state drive (SSD). Alternatively, for example, when a capacity to be stored is small or information (data) is processed in real time, the storage 22 may be configured by a memory such as a RAM.

The image processing device 21 and the image processing system 20 including the same according to the fourth example embodiment include configurations similar to those in the second or third example embodiments, and therefore, an advantageous effect similar to those in the second or third example embodiments can be obtained.

Figure 21:
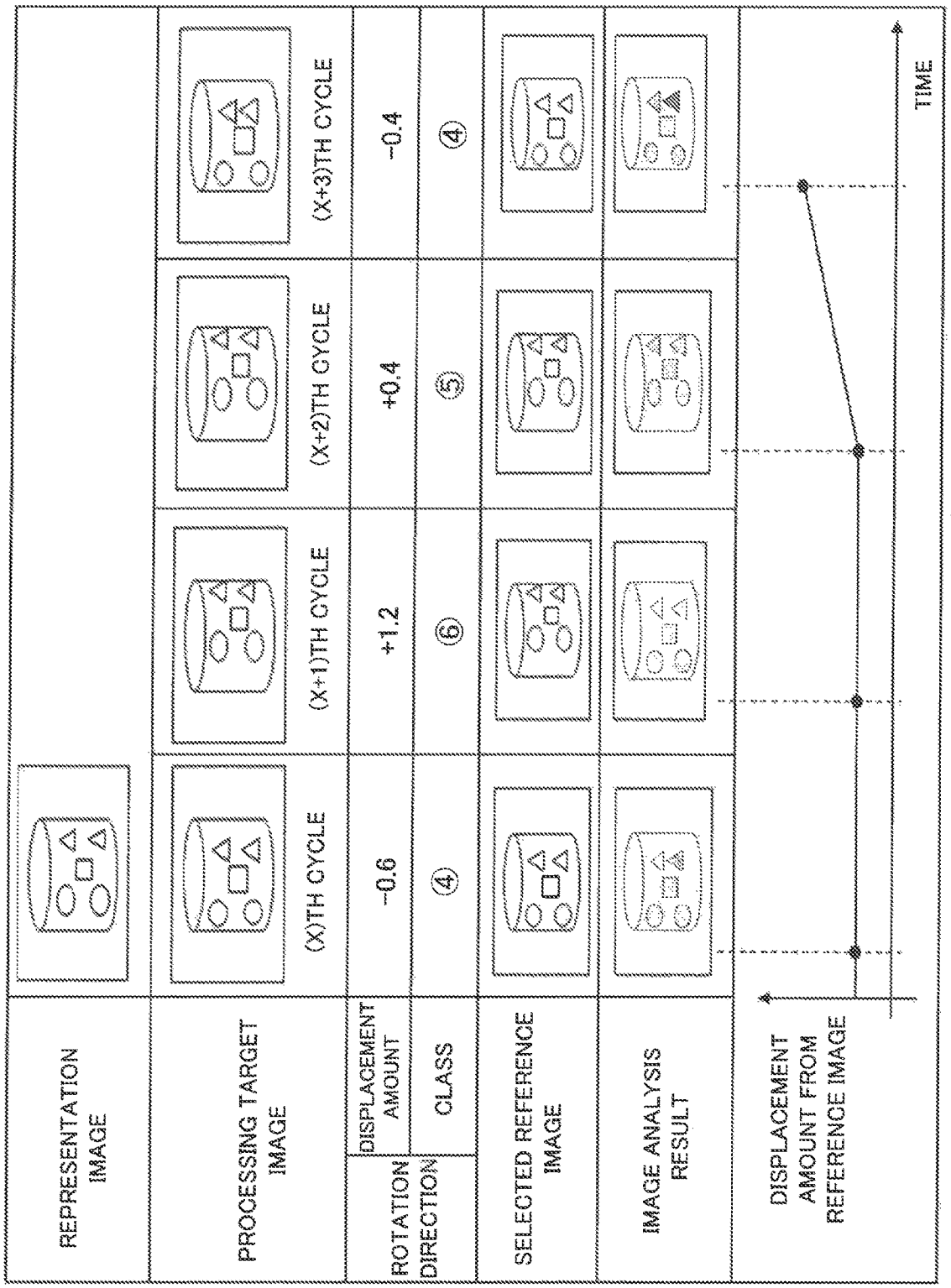
FIG. 21 is a diagram representing a specific example of information (data) obtained by an operation of an image processing device according to the fourth example embodiment.

Herein, a specific operation example of the image processing device 21 according to the fourth example embodiment is described by utilizing FIG. 21. Note that the operation example in this description is an operation example based on the second example embodiment.

For example, it is assumed that the image device 24 activates based on a signal obtained by the movement detection device 33 when the observation target object is in an $(X)_{th}$ cycle operation, and an image of the observation target object in the $(X)_{th}$ cycle is captured. When receiving the captured image, the capture control unit 211 of the image processing device 21 determines the captured image as the processing target image in the $(X)_{th}$ cycle. Moreover, a plurality of the representation images are stored with the image storage unit 221 of the storage 22, and, from among the representation images, the representation selection unit 212 selects the representation image, as the representation image to be associated with the processing target image in the $(X)_{th}$ cycle. Then, the displacement analysis unit 213 calculates a displacement amount between a processing target image in the $(X)_{th}$ cycle and the representation image, and obtains, for example, −0.6 [pixel].

Figure 22:
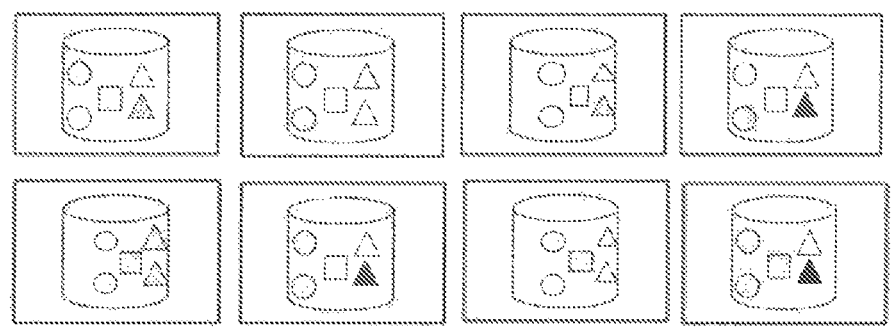
FIG. 22 is a diagram representing a specific display example of an analysis result by the image processing device according to the fourth example embodiment.
Figure 23:
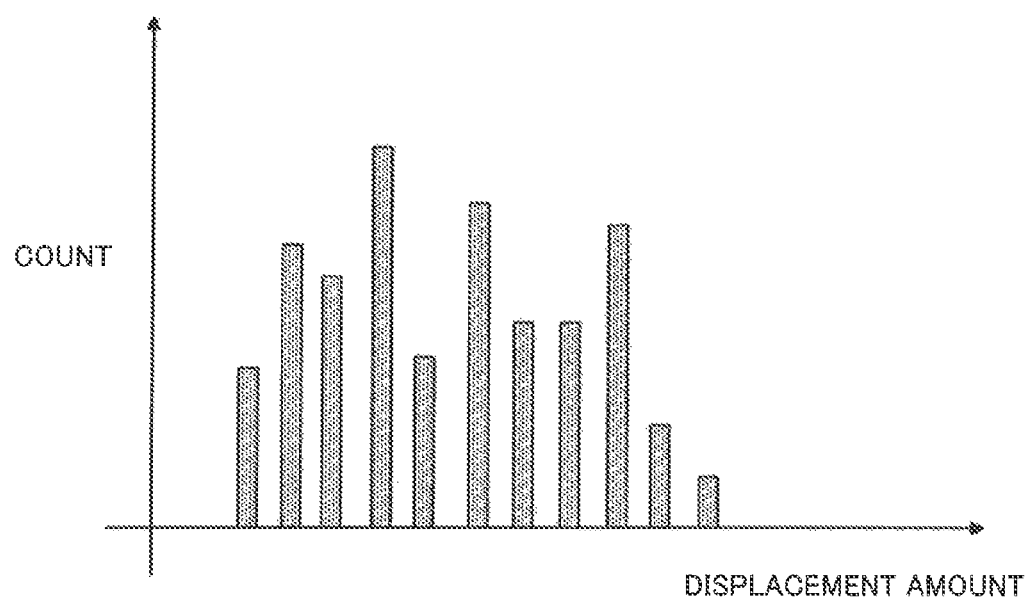
FIG. 23 is a diagram representing a specific display example of another analysis result by the image processing device according to the fourth example embodiment.

The reference selection unit 214 selects the reference image, as the reference image closest to the calculated displacement amount −0.6 [pixel]. Further, the image analysis unit 215 analyzes a displacement distribution between the processing target image in the $(X)_{th}$ cycle and the selected reference image, and obtains a displacement distribution image. For example, the image processing device 21 outputs the obtained the displacement distribution image to the display device as an analysis result. FIG. 22 represents a display example in which a plurality of the displacement distribution images obtained as described above are collectively displayed. Together with the displacement distribution images, relational data between the displacement amount (class) and a number of appearance (count) of the displacement amount, obtained by processing of the displacement analysis unit 213, as represented in FIG. 23, may also be displayed.

Figure 24:
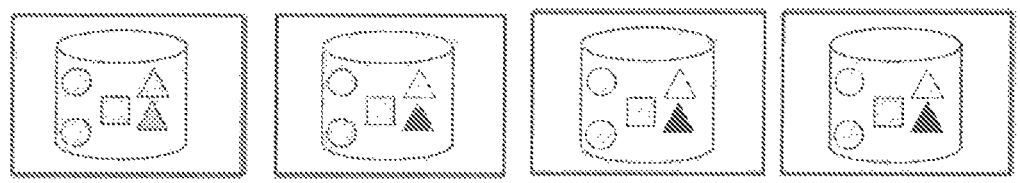
FIG. 24 is a diagram representing a specific display example of still another analysis result by the image processing device according to the fourth example embodiment.
Figure 25:
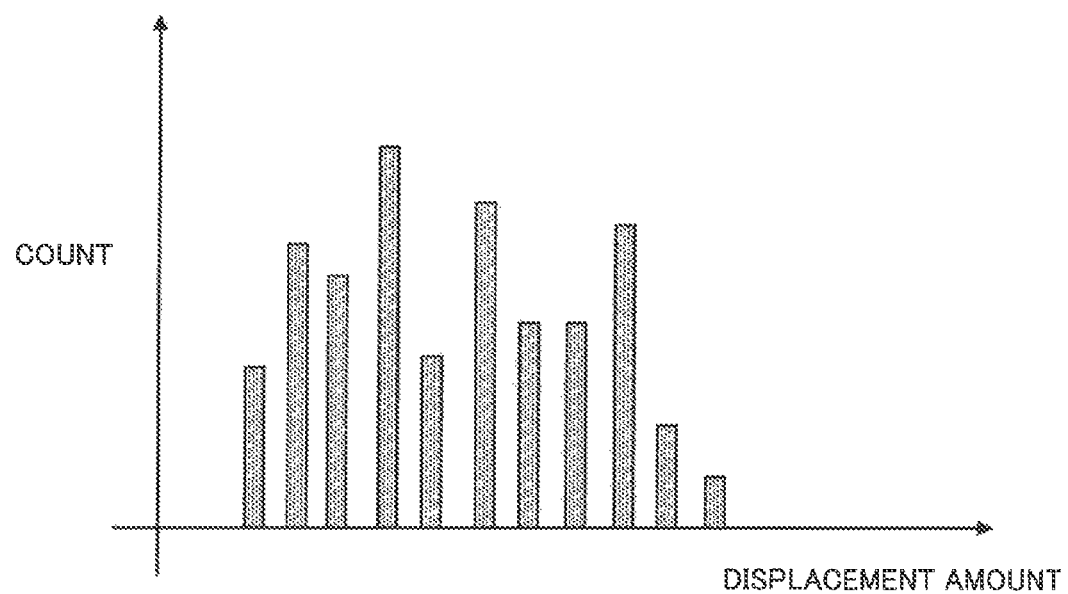
FIG. 25 is a diagram representing a specific display example of yet another analysis result by the image processing device according to the fourth example embodiment.

Furthermore, when the image sort unit 217 is provided, the displacement distribution image after selection and sort processing are performed as in FIG. 24, and relational data between the displacement amount (class) and a number of appearance (count) of the displacement amount, as represented in FIG. 25, may be switchingly displayed.

The present invention is described above with the above-described example embodiments as exemplary examples. However, the present invention is not limited to the above-described example embodiments. In other words, various aspects that may be understood by a person skilled in the art are applicable to the present invention within the scope of the present invention.

REFERENCE SIGNS LIST 1, 21: Image processing device
2, 212: Representation selection unit
3, 213: Displacement analysis unit
4, 214: Reference selection unit
7, 24: Image device
215: Image analysis unit
217: Image sort unit

The invention claimed is:
1. An image processing device comprising:
a processor configured to:
   select a representation image from among captured images in which a target object to be detected is captured, the representation image being a criterion for processing;
   calculate a displacement amount between the representation image and a processing target image by comparing and analyzing the representation image and the processing target image after the representation image is selected, the processing target image being a captured image which differs from the captured image selected as the representation image; and
   select, from among the captured images determined as reference images, the reference image to be used in processing of analyzing motion of the target object based on information associated with reference image,
   wherein the information is information on a displacement amount between each reference image and the representation image, and the processor selects, as the reference image to be used in processing of analyzing motion of the target object, a reference image that has an associated displacement amount within a preset range of the displacement amount between the representation image and the processing target image, or
   wherein the information is information on a class based on displacement amounts between each reference image and the representation image that is associated with each reference image, the processor determines a class of the displacement amount between the representation image and the processing target image, and the processor selects, as the reference image to be used in processing of analyzing motion of the target object, a reference image belonging to the determined class, or
   wherein the processor calculates the displacement amount in a predetermined movement direction of the target object, the information is information on a displacement amount in the predetermined movement direction between each reference image and the representation image that is associated with each reference image, and the processor selects the reference image to be used in processing of analyzing motion of the target object based on the calculated displacement amount in the predetermined movement direction.

2. The image processing device according to claim 1, wherein information obtained during image capture of the target object is associated with the reference images, and
   the processor selects the reference image to be used in processing of analyzing motion of the target object based on the displacement amount and the information obtained during the image capture.

3. The image processing device according to claim 1, wherein the processor analyzes motion of the target object by comparing the captured image in which the target object is captured with the reference image in order to be used in processing of analyzing motion of the target object.

4. The image processing device according to claim 1, wherein the processor sorts the reference images in accordance with a previously given rule based on information associated with each reference image.

5. An image processing method comprising:
by a processor,
   selecting a representation image from among captured images in which a target object to be detected is captured, the representation image being a criterion for processing;
   calculating a displacement amount between the representation image and a processing target image by comparing and analyzing the representation image and the processing target image after the representation image is selected, the processing target image being a captured image which differs from the captured image selected as the representation image; and
   selecting, from among the captured images determined as reference images, the reference image to be used in processing of analyzing motion of the target object based on information associated with each reference image,
   wherein the information is information on a displacement amount between each reference image and the representation image, and the processor selects, as a reference image to be used in processing of analyzing motion of the target object, a reference image that has an associated displacement amount within a preset range of the displacement amount between the representation image and the processing target image, or
   wherein the information is information on a class based on displacement amounts between each reference image and the representation image that is associated with each reference image, the processor determines a class of the displacement amount between the representation image and the processing target image, and the processor selects, as the reference image to be used in processing of analyzing motion of the target object, a reference image belonging to the determined class, or wherein the processor calculates the displacement amount in a predetermined movement direction of the target object, the information is information on a displacement amount in the predetermined movement direction between each reference image and the representation image that is associated with each reference image, and the processor selects the reference image to be used in processing of analyzing motion of the target object based on the calculated displacement amount in the predetermined movement direction.

6. A non-transitory program storage medium storing a computer program which causes a computer to execute:

selecting a representation image from among captured images in which a target object to be detected is captured, the representation image being a criterion for processing;

calculating a displacement amount between the representation image and a processing target image by comparing and analyzing the representation image and the processing target image after the representation image is selected, the processing target image being a captured image which differs from the captured image selected as the representation image; and selecting, from among the captured images determined as reference images, the reference image to be used in processing of analyzing motion of the target object based on information associated with each reference image, wherein the information on a displacement amount between each reference image and the representation image, and the computer selects, a reference image that has an associated displacement amount within a preset range of the displacement amount between the representation image and the processing target image, or wherein the information is information on a class based on displacement amounts between each reference image and the representation image that is associated with each reference image, the computer determines a class of the displacement amount between the representation image and the processing target image, and the computer selects, as the reference image to be used in processing of analyzing motion of the target object, a reference image belonging to the determined class, or wherein the computer calculates the displacement amount in a predetermined movement direction of the target object, the information is information on a displacement amount in the predetermined movement direction between each reference image and the representation image that is associated with each reference image, and the computer selects the reference image to be used in processing of analyzing motion of the target object based on the calculated displacement amount in the predetermined movement direction.

* * * * *